US011647436B2

(12) United States Patent
Zhu et al.

(10) Patent No.: US 11,647,436 B2
(45) Date of Patent: May 9, 2023

(54) GATEWAY HANDOVER METHOD, GATEWAY RESELECTION METHOD, AND COMMUNICATIONS APPARATUS

(71) Applicant: Huawei Technologies Co., Ltd., Shenzhen (CN)

(72) Inventors: Haoren Zhu, Shanghai (CN); Wei Lu, Shenzhen (CN); Hualin Zhu, Shanghai (CN); Huan Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/207,468

(22) Filed: Mar. 19, 2021

(65) Prior Publication Data
US 2021/0211958 A1 Jul. 8, 2021

Related U.S. Application Data

(63) Continuation of application No. PCT/CN2019/106910, filed on Sep. 20, 2019.

(30) Foreign Application Priority Data

Sep. 21, 2018 (CN) .......................... 201811109959.3

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0061* (2013.01); *H04W 36/32* (2013.01); *H04W 36/36* (2013.01)

(58) Field of Classification Search
CPC . H04W 36/08; H04W 36/0061; H04W 36/32; H04W 36/36; H04W 28/0842;
(Continued)

(56) References Cited

U.S. PATENT DOCUMENTS

2007/0116011 A1* 5/2007 Lim .................... H04L 61/2092
370/395.52
2010/0124200 A1* 5/2010 Ergen ................ H04W 36/0016
370/331
(Continued)

FOREIGN PATENT DOCUMENTS

CN 102223677 A 10/2011
CN 104661205 A 5/2015
(Continued)

OTHER PUBLICATIONS

Nguyen-Vuong, Q.-T. et al., "Terminal-Controlled Mobility Management in Heterogeneous Wireless Networks", IEEE Communications Magazine, IEEE Service Center, Piscataway, US, vol. 45, No. 4, Apr. 1, 2007, pp. 122-129.
(Continued)

*Primary Examiner* — Charles N Appiah
*Assistant Examiner* — Frank E Donado
(74) *Attorney, Agent, or Firm* — Slater Matsil, LLP

(57) ABSTRACT

Embodiments of this application provide a gateway handover method, a gateway reselection method, and a communications apparatus. The method includes: A source gateway determines to perform gateway handover on a terminal device; determines a target gateway that is to be used to serve the terminal device; and hands over the terminal device from the source gateway to the target gateway. According to the gateway handover method, the gateway reselection method, and the communications apparatus provided in the embodiments of this application, in a non-3GPP network architecture, when gateway handover needs to be performed on the terminal device, the source gateway of the terminal device or the terminal device may hand over the terminal device from the source gateway of the terminal
(Continued)

device to the target gateway, to implement gateway handover in the non-3GPP network architecture.

16 Claims, 12 Drawing Sheets

(51) Int. Cl.
*H04W 36/32* (2009.01)
*H04W 36/36* (2009.01)

(58) Field of Classification Search
CPC ..... H04W 36/12; H04W 88/16; H04W 92/06; H04W 36/0016; H04W 36/0055
See application file for complete search history.

(56) References Cited

U.S. PATENT DOCUMENTS

| | | | |
|---|---|---|---|
| 2013/0286821 A1* | 10/2013 | Liu | H04W 48/04 370/225 |
| 2013/0310042 A1 | 11/2013 | Wu et al. | |
| 2017/0005914 A1* | 1/2017 | Edge | H04L 45/745 |
| 2017/0105155 A1* | 4/2017 | Zhao | H04W 36/12 |
| 2018/0132101 A1* | 5/2018 | Rommer | H04W 12/06 |

FOREIGN PATENT DOCUMENTS

| | | |
|---|---|---|
| CN | 106686676 A | 5/2017 |
| EP | 2079253 A1 | 7/2009 |
| EP | 2079261 A1 | 7/2009 |
| WO | 2017076126 A1 | 5/2017 |

OTHER PUBLICATIONS

NEC, "Triggering Local GW Relocation", 3GPP TSG SA WG2 Meeting #77, S2-100100, Shenzhen, China, Jan. 18-22, 2010, 6 pages.

Motorola Mobility et al., "Updates to Solution 8.7: Support stand-alone non-3GPP access via NG2/NG3", SA WG2 Meeting #118, S2-166380, Reno, Nevada, US, 16 pages.

Motorola Mobility et al., "23.502: N3IWF Selection procedure", SA WG2 Meeting #124, S2-17870927, Reno, Nevada, US, Nov. 27-Dec. 1, 2017, 3 pages.

3GPP TS 24.502 V0.5.0 (Apr. 2018), 3rd Generation Partnership Project; Technical Specification Group Core Network and Terminals; Access to the 3GPP SG Core Network (SGCN) via Non-3GPP Access Networks (N3AN); Stage 3 (Release 15), 31 pages.

3GPP TS 23.402 V15.3.0, "3rd Generation Partnership Project, Technical Specification Group Services and System Aspects, Architecture enhancements for non-3GPP accesses (Release 15)", Mar. 2018, 314 pages.

3GPP TS 23.003 V15.8.0, "3rd Generation Partnership Project, Technical Specification Group Core Network and Terminals, Numbering, addressing and identification (Release 15)", Sep. 2019, 131 pages.

3GPP TS 23.501 V16.1.0, "3rd Generation Partnership Project, Technical Specification Group Services and System Aspects, System Architecture for the 5G System, Stage 2 (Release 16)", Jun. 2019, 368 pages.

3GPP TS 23.502 V15.3.0, "3rd Generation Partnership Project, Technical Specification Group Services and System Aspects, Procedures for the 5G System, Stage 2 (Release 15)", Sep. 2018, 330 pages.

3GPP TS 38.300 V15.2.0, "3rd Generation Partnership Project, Technical Specification Group Radio Access Network, NR, NR and NG-RAN Overall Description, Stage 2 (Release 15)", Jun. 2018, 87 pages.

* cited by examiner

GATEWAY HANDOVER METHOD, GATEWAY RESELECTION METHOD, AND COMMUNICATIONS APPARATUS

CROSS-REFERENCE TO RELATED APPLICATIONS

This application is a continuation of International Application No. PCT/CN2019/106910, filed on Sep. 20, 2019, which claims priority to Chinese Patent Application No. 201811109959.3, filed on Sep. 21, 2018. The disclosures of the aforementioned applications are hereby incorporated by reference in their entireties.

TECHNICAL FIELD

Embodiments of this application relate to communications technologies, and in particular, to a gateway handover method, a gateway reselection method, and a communications apparatus.

BACKGROUND

A network architecture supporting a 5th generation mobile communications technology (fifth-generation, 5G) includes a network architecture (3GPP network architecture for short) supporting a 3rd generation partnership project (3GPP) technology and a network architecture (non-3GPP network architecture for short) supporting a non-3rd generation partnership project (non-3GPP) technology.

In the non-3GPP network architecture, a terminal device may access a 3GPP core network by using a non-3GPP access network device. To improve security of data transmission, the terminal device communicates with the core network by using a secure tunnel. Therefore, a "gateway" for establishing a secure tunnel is newly added to the non-3GPP network architecture. However, the existing non-3GPP network architecture does not involve a gateway handover mechanism.

SUMMARY

Embodiments of this application provide a gateway handover method, a gateway reselection method, and a communications apparatus, to provide a gateway handover mechanism in a non-3GPP network architecture.

According to a first aspect, an embodiment of this application provides a gateway handover method. In the method, a source gateway may determine whether to perform gateway handover on a terminal device; when determining to perform gateway handover on the terminal device, determine a target gateway that is to be used to serve the terminal device; and hand over the terminal device from the source gateway to the target gateway. In this manner, when gateway handover needs to be performed on the terminal device, the source gateway may hand over the terminal device from the source gateway of the terminal device to the target gateway, to implement gateway handover in a non-3GPP network architecture, thereby expanding a use scenario of the non-3GPP network architecture.

The source gateway may determine to perform gateway handover on the terminal device in the following manners:

Manner 1: The source gateway receives indication information from a core network element. The indication information is used to indicate to perform gateway handover on the terminal device. The source gateway determines, based on the indication information, to perform gateway handover on the terminal device.

Manner 2: The source gateway determines, based on location information of the terminal device and configuration information of the source gateway, to perform gateway handover on the terminal device. For example, when the configuration information of the source gateway includes a service area of the source gateway, the source gateway may determine, based on the location information of the terminal device and the service area of the source gateway, whether the terminal device exceeds the service area of the source gateway. If the terminal device exceeds the service area of the source gateway, the source gateway determines to perform gateway handover on the terminal device.

In this implementation, the source gateway may further obtain the location information of the terminal device. For example, the source gateway receives the location information from the terminal device; or the source gateway receives the location information from a core network element.

Manner 3: The source gateway determines, based on location information of the terminal device and information about a user plane network element, a gateway that the terminal device expects to access. Then, the source gateway may determine whether the gateway that the terminal device expects to access is the same as the source gateway. If the gateway that the terminal device expects to access is different from the source gateway, the source gateway determines to perform gateway handover on the terminal device. The information about the user plane network element includes an identifier of the user plane network element and/or location information of the user plane network element.

In this implementation, the source gateway may obtain the information about the user plane network element. For example, the source gateway receives the information about the user plane network element from a core network element. Optionally, the source gateway may further receive user plane change indication information from the core network element.

In the foregoing three manners, the source gateway may trigger, by using different trigger mechanisms, a gateway handover operation on the terminal device, to implement gateway handover of the terminal device in the non-3GPP network architecture, thereby expanding a use scenario of the non-3GPP network architecture.

When the first two manners are used to determine to perform gateway handover on the terminal device, the source gateway may determine the target gateway based on the location information of the terminal device and gateway configuration information. The gateway configuration information includes identification information of a candidate gateway and location information of the candidate gateway.

Alternatively, the source gateway sends a request message to a domain name server. The request message is used to request the target gateway. The source gateway receives identification information of the target gateway from the domain name server. The source gateway determines the target gateway based on the identification information of the target gateway. The foregoing described request message includes, for example, the location information of the terminal device.

Alternatively, the source gateway sends a request message to a network function repository function network element. The source gateway receives identification information of the target gateway from the network function repository function network element. The source gateway determines the target gateway based on the identification information of the target gateway.

In the foregoing manners of determining the target gateway, the source gateway may obtain the target gateway in a plurality of manners, thereby expanding a use scenario of performing gateway handover in the non-3GPP network architecture.

When Manner 3 is used to determine to perform gateway handover on the terminal device, the source gateway determines, based on the location information of the terminal device, the information about the user plane network element, and gateway configuration information, the gateway that the terminal device expects to access. The gateway configuration information includes identification information of a candidate gateway and location information of the candidate gateway. For example, the source gateway may determine, based on the location information of the terminal device and the information about the user plane network element, a candidate gateway from the gateway configuration information as the gateway that the terminal device expects to access. In this implementation, when the gateway that the terminal device expects to access is different from the source gateway, the source gateway may use, as the target gateway, the gateway that the terminal device expects to access.

Alternatively, the source gateway sends a request message to a domain name server. The request message is used to request the gateway that the terminal device expects to access. The source gateway receives, from the domain name server, identification information of the gateway that the terminal device expects to access. The source gateway determines, based on the identification information of the gateway that the terminal device expects to access, the gateway that the terminal device expects to access. The request message includes the location information of the terminal device and user plane information.

Alternatively, the source gateway sends a request message to a network function repository function network element. The source gateway receives, from the network function repository function network element, identification information of the gateway that the terminal device expects to access. The source gateway determines, based on the identification information of the gateway that the terminal device expects to access, the gateway that the terminal device expects to access. The request message includes the location information of the terminal device and user plane information.

In the foregoing manners in which the gateway that the terminal device expects to access is determined based on the user plane information, the gateway that the terminal device expects to access and that is obtained by the source gateway can ensure a relatively optimal path between the terminal device and the user plane network element.

According to a second aspect, an embodiment of this application provides a gateway reselection method. In the method, a terminal device may determine whether to perform gateway reselection; when determining to perform gateway reselection, determine a target gateway that is to be used to serve the terminal device; and perform reselection from a source gateway to the target gateway. In this manner, when gateway reselection needs to be performed on the terminal device, the terminal device may perform reselection from the source gateway to the target gateway, to implement gateway reselection in a non-3GPP network architecture, thereby expanding a use scenario of the non-3GPP network architecture.

For example, the terminal device may send a registration update request to the target gateway, and carry a mobility registration update type into the request, to perform reselection from the source gateway to the target gateway. In this manner, based on a relatively small change to an existing procedure, the terminal device may implement gateway reselection by using the existing procedure.

The terminal device may determine to perform gateway reselection in the following manners:

Manner 1: The terminal device determines, based on a change of an access network device accessed by the terminal device, to perform gateway reselection on the terminal device. For example, when the access network device accessed by the terminal device changes, the terminal device determines a gateway that the terminal device expects to access. The terminal device determines whether the gateway that the terminal device expects to access is different from the source gateway. If the gateway that the terminal device expects to access is different from the source gateway, the terminal device determines to perform gateway reselection on the terminal device. In this implementation, when the gateway that the terminal device expects to access is different from the source gateway, the terminal device may use, as the target gateway, the gateway that the terminal device expects to access.

Optionally, the terminal device may further obtain identification information of the access network device accessed by the terminal device. For example, the terminal device receives a broadcast message from the access network device. The broadcast message includes the identification information of the access network device.

In the foregoing implementation, the terminal device may determine, based on location information of the terminal device and gateway configuration information, the gateway that the terminal device expects to access. The gateway configuration information includes identification information of a candidate gateway and location information of the candidate gateway.

Alternatively, the terminal device sends a request message to a domain name server. The request message is used to request the gateway that the terminal device expects to access. The terminal device receives, from the domain name server, identification information of the gateway that the terminal device expects to access. The terminal device determines, based on the identification information of the gateway that the terminal device expects to access, the gateway that the terminal device expects to access. For example, the request message includes location information of the terminal device.

In the foregoing manners of determining the target gateway, the terminal device may obtain the target gateway in a plurality of manners, thereby expanding a use scenario of performing gateway reselection in the non-3GPP network architecture.

Manner 2: The terminal device determines, based on location information of the terminal device and information about a user plane network element, a gateway that the terminal device expects to access. Then, the terminal device determines whether the gateway that the terminal device expects to access is different from the source gateway. If the gateway that the terminal device expects to access is different from the source gateway, the terminal device determines to perform gateway reselection on the terminal device. Herein, the information about the user plane network element includes an identifier of the user plane network element and/or location information of the user plane network element. In this implementation, when the gateway that the terminal device expects to access is different from the source gateway, the terminal device may use, as the target gateway, the gateway that the terminal device expects to access.

Optionally, the terminal device may further obtain the information about the user plane network element. For example, the terminal device receives user plane information from a core network element. Optionally, the terminal device may further receive user plane change indication information from the core network element.

In the foregoing implementation, the terminal device may determine, based on the location information of the terminal device, the information about the user plane network element, and gateway configuration information, the gateway that the terminal device expects to access. The gateway configuration information includes identification information of a candidate gateway and location information of the candidate gateway. For example, the terminal device may determine, based on the location information of the terminal device and the information about the user plane network element, a candidate gateway from the gateway configuration information as the gateway that the terminal device expects to access.

Alternatively, the terminal device sends a request message to a domain name server. The request message is used to request the gateway that the terminal device expects to access. The terminal device receives, from the domain name server, identification information of the gateway that the terminal device expects to access. The terminal device determines, based on the identification information of the gateway that the terminal device expects to access, the gateway that the terminal device expects to access. The request message includes the location information of the terminal device and user plane information.

In the foregoing manners in which the gateway that the terminal device expects to access is determined based on the user plane information, the gateway that is expected to be accessed and that is obtained by the terminal device can ensure a relatively optimal path between the terminal device and the user plane network element.

In addition, in the foregoing two gateway reselection manners, the terminal device may trigger, by using different trigger mechanisms, a gateway reselection operation, to implement gateway reselection of the terminal device in the non-3GPP network architecture, thereby expanding a use scenario of the non-3GPP network architecture.

According to a third aspect, an embodiment of this application provides a gateway handover method. In the method, a core network element may determine whether to perform gateway handover on a terminal device. When determining to perform gateway handover on the terminal device, the core network element sends indication information to a source gateway. The indication information is used to indicate to perform gateway handover on the terminal device, so that the source gateway implements gateway handover in a non-3GPP network architecture.

Optionally, the core network element may obtain location information of the terminal device. In this case, the core network element may determine, based on the location information of the terminal device and configuration information of the source gateway, to perform gateway handover on the terminal device. For example, the configuration information of the source gateway includes a service area of the source gateway. In this case, the core network element determines, based on the location information of the terminal device and the service area of the source gateway, whether the terminal device exceeds the service area of the source gateway. If the terminal device exceeds the service area of the source gateway, the core network element determines to perform gateway handover on the terminal device.

In specific implementation, the core network element may obtain the location information of the terminal device in a manner of receiving the location information from the terminal device.

According to a fourth aspect, an embodiment of this application provides a gateway handover method. In the method, a core network element may determine that user plane reconfiguration of a terminal device is completed; and when the user plane reconfiguration is completed, send information about a user plane network element to a gateway (for example, a source gateway of the terminal device) or the terminal device, so that the source gateway or the terminal device implements gateway handover in a non-3GPP network architecture based on the information about the user plane network element when the user plane reconfiguration is completed. The information about the user plane network element includes an identifier of the user plane network element and/or location information of the user plane network element. In the foregoing manner of sending the information about the user plane network element to the gateway, the source gateway may be implicitly triggered to perform a gateway handover operation. Alternatively, in the foregoing manner of sending the information about the user plane network element to the terminal device, the terminal device may be implicitly triggered to perform a gateway reselection operation, thereby expanding a use scenario of performing gateway handover in the non-3GPP network architecture.

Optionally, the core network element may further send user plane change indication information to the gateway or the terminal device, to explicitly indicate that a user plane of the terminal device changes.

According to a fifth aspect, an embodiment of this application provides a communications apparatus. The communications apparatus in this embodiment may be the foregoing described gateway, or may be a chip used in the gateway. The communications apparatus may be configured to perform actions of the source gateway in the foregoing method embodiments. The communications apparatus may include a processing unit. Optionally, the communications apparatus further includes a sending unit and a receiving unit.

The processing unit determines to: perform gateway handover on a terminal device, determine a target gateway that is to be used to serve the terminal device, and hand over the terminal device from the source gateway to a target gateway.

In a possible implementation, the processing unit is specifically configured to: receive indication information from a core network element by using the receiving unit, and determine, based on the indication information, to perform gateway handover on the terminal device. The indication information is used to indicate to perform gateway handover on the terminal device.

In another possible implementation, the processing unit is further configured to obtain location information of the terminal device. For example, the processing unit is specifically configured to: receive the location information from the terminal device by using the receiving unit, or receive the location information from a core network element by using the receiving unit.

In the foregoing two implementations, the processing unit is specifically configured to determine, based on the location information of the terminal device and configuration information of the source gateway, to perform gateway handover on the terminal device. For example, when the configuration information of the source gateway includes a service area of the source gateway, the processing unit is specifically configured to: determine, based on the location information of the terminal device and the service area of the source gateway, that the terminal device exceeds the service area of the source gateway; and determine to perform gateway handover on the terminal device.

Correspondingly, in the foregoing two implementations, the processing unit is specifically configured to determine the target gateway based on the location information of the terminal device and gateway configuration information. The gateway configuration information includes identification information of a candidate gateway and location information of the candidate gateway.

Alternatively, the processing unit is specifically configured to: send a request message to a domain name server by using the sending unit, receive identification information of the target gateway from the domain name server by using the receiving unit, and determine the target gateway based on the identification information of the target gateway. The request message is used to request the target gateway. For example, the request message includes the location information of the terminal device.

Alternatively, the processing unit is specifically configured to: send a request message to a network function repository function network element by using the sending unit, receive identification information of the target gateway from the network function repository function network element by using the receiving unit, and determine the target gateway based on the identification information of the target gateway. The request message is used to request the target gateway. For example, the request message includes the location information of the terminal device.

In still another possible implementation, the processing unit is specifically configured to: determine, based on location information of the terminal device and information about a user plane network element, a gateway that the terminal device expects to access; determine that the gateway that the terminal device expects to access is different from the source gateway; and determine to perform gateway handover on the terminal device. The information about the user plane network element may include an identifier of the user plane network element and/or location information of the user plane network element.

Optionally, the processing unit is further configured to obtain the information about the user plane network element. For example, the processing unit is specifically configured to receive the information about the user plane network element from a core network element by using the receiving unit. In some embodiments, the processing unit is further configured to receive user plane change indication information from the core network element by using the receiving unit.

In this implementation, the processing unit is specifically configured to determine, based on the location information of the terminal device, the information about the user plane network element, and gateway configuration information, the gateway that the terminal device expects to access. The gateway configuration information includes identification information of a candidate gateway and location information of the candidate gateway. For example, the processing unit is specifically configured to: determine, based on the location information of the terminal device and the information about the user plane network element, a candidate gateway from the gateway configuration information as the gateway that the terminal device expects to access; and when the gateway that the terminal device expects to access is different from the source gateway, use, as the target gateway, the gateway that the terminal device expects to access.

Alternatively, the processing unit is specifically configured to: send a request message to a domain name server by using the sending unit; receive, from the domain name server by using the receiving unit, identification information of the gateway that the terminal device expects to access; and determine, based on the identification information of the gateway that the terminal device expects to access, the gateway that the terminal device expects to access. The request message is used to request the gateway that the terminal device expects to access. The request message includes the location information of the terminal device and user plane information.

Alternatively, the processing unit is further configured to: send a request message to a network function repository function network element by using the sending unit; receive, from the network function repository function network element by using the receiving unit, identification information of the gateway that the terminal device expects to access; and determine, based on the identification information of the gateway that the terminal device expects to access, the gateway that the terminal device expects to access. The request message is used to request the target gateway. The request message includes the location information of the terminal device and user plane information.

For beneficial effects of the communications apparatus provided in the fifth aspect and each possible implementation of the fifth aspect, refer to the beneficial effects brought by the first aspect and each possible implementation of the first aspect. Details are not described herein again.

According to a sixth aspect, an embodiment of this application provides a communications apparatus. The communications apparatus in this embodiment may be the foregoing described terminal device, or may be a chip used in the terminal device. The communications apparatus may be configured to perform actions of the terminal device in the foregoing method embodiments. The communications apparatus may include a processing unit. Optionally, the communications apparatus further includes a sending unit and a receiving unit. The processing unit is configured to: determine to perform gateway reselection on the terminal device, determine a target gateway that is to be used to serve the terminal device, and perform reselection from a source gateway to the target gateway. For example, the processing unit is specifically configured to send a registration update request to the target gateway by using the sending unit. The registration update request includes a mobility registration update type.

In a possible implementation, the processing unit is specifically configured to determine, based on a change of an access network device accessed by the terminal device, to perform gateway reselection on the terminal device. For example, the processing unit is specifically configured to: when the access network device accessed by the terminal device changes, determine a gateway that the terminal device expects to access; determine that the gateway that the terminal device expects to access is different from the source gateway; and determine to perform gateway reselection on the terminal device. For example, the processing unit is specifically configured to: when the gateway that the terminal device expects to access is different from the source gateway, use, as the target gateway, the gateway that the terminal device expects to access.

For example, the processing unit is specifically configured to determine, based on location information of the terminal device and gateway configuration information, the gateway that the terminal device expects to access. The gateway configuration information includes identification information of a candidate gateway and location information of the candidate gateway.

Alternatively, the processing unit is specifically configured to: send a request message to a domain name server by using the sending unit; receive, from the domain name server by using the receiving unit, identification information of the gateway that the terminal device expects to access; and determine, based on the identification information of the gateway that the terminal device expects to access, the gateway that the terminal device expects to access. The request message is used to request the gateway that the terminal device expects to access. For example, the request message includes location information of the terminal device.

Optionally, in this implementation, the processing unit is further configured to obtain identification information of the access network device accessed by the terminal device. For example, the processing unit is specifically configured to receive a broadcast message from the access network device by using the receiving unit. The broadcast message includes the identification information of the access network device.

In another possible implementation, the processing unit is specifically configured to: determine, based on location information of the terminal device and information about a user plane network element, a gateway that the terminal device expects to access; determine that the gateway that the terminal device expects to access is different from the source gateway; and determine to perform gateway reselection on the terminal device. The information about the user plane network element may include an identifier of the user plane network element and/or location information of the user plane network element.

Optionally, the processing unit is further configured to obtain the information about the user plane network element. For example, the processing unit is specifically configured to receive user plane information from a core network element by using the receiving unit. In some embodiments, the processing unit is further configured to receive user plane change indication information from the core network element by using the receiving unit.

In this implementation, the processing unit is specifically configured to determine, based on the location information of the terminal device, the information about the user plane network element, and gateway configuration information, the gateway that the terminal device expects to access. For example, the gateway configuration information includes identification information of a candidate gateway and location information of the candidate gateway. For example, the processing unit is specifically configured to: determine, based on the location information of the terminal device and the information about the user plane network element, a candidate gateway from the gateway configuration information as the gateway that the terminal device expects to access; and when the gateway that the terminal device expects to access is different from the source gateway, use, as the target gateway, the gateway that the terminal device expects to access.

Alternatively, the processing unit is specifically configured to: send a request message to a domain name server by using the sending unit; receive, from the domain name server by using the receiving unit, identification information of the gateway that the terminal device expects to access; and determine, based on the identification information of the gateway that the terminal device expects to access, the gateway that the terminal device expects to access. The request message is used to request the target gateway. The request message includes the location information of the terminal device and user plane information.

The communications apparatus provided in this embodiment of this application may perform actions of the terminal device in the foregoing method embodiments. An implementation principle and a technical effect thereof are similar to those in the method embodiments. Details are not described herein again.

For beneficial effects of the communications apparatus provided in the sixth aspect and each possible implementation of the sixth aspect, refer to the beneficial effects brought by the second aspect and each possible implementation of the second aspect. Details are not described herein again.

According to a seventh aspect, an embodiment of this application provides a communications apparatus. The communications apparatus in this embodiment may be the foregoing described network element that sends indication information to a source gateway to indicate the source gateway to perform gateway handover on a terminal device, or may be a chip used in the network element. The network element may be, for example, a core network element (for example, an AMF network element or an SMF network element), or may be a third-party network element. The communications apparatus may include a processing unit and a sending unit. Optionally, the communications apparatus may further include a receiving unit. The processing unit is configured to determine to perform gateway handover on the terminal device. The sending unit is configured to send indication information to the source gateway. The indication information is used to indicate to perform gateway handover on the terminal device.

Optionally, the processing unit is further configured to obtain location information of the terminal device. For example, the processing unit is specifically configured to receive the location information from the terminal device by using the receiving unit.

In this implementation, the processing unit is specifically configured to determine, based on the location information of the terminal device and configuration information of the source gateway, to perform gateway handover on the terminal device. For example, when the configuration information of the source gateway includes a service area of the source gateway, the processing unit is specifically configured to: determine, based on the location information of the terminal device and the service area of the source gateway, that the terminal device exceeds the service area of the source gateway; and determine to perform gateway handover on the terminal device.

The communications apparatus provided in this embodiment of this application may perform the action performed by the network element for sending the indication information to the source gateway to indicate the source gateway to perform gateway handover on the terminal device in the foregoing method embodiments. An implementation principle and a technical effect thereof are similar to those in the method embodiments. Details are not described herein again.

For beneficial effects of the communications apparatus provided in the seventh aspect and each possible implementation of the seventh aspect, refer to the beneficial effects brought by the third aspect and each possible implementation of the third aspect. Details are not described herein again.

According to an eighth aspect, an embodiment of this application provides a communications apparatus. The communications apparatus in this embodiment may be the foregoing described network element that sends information about a user plane network element to a source gateway or a terminal device, or may be a chip used in the network element. The network element may be, for example, a core network element (for example, an AMF network element or an SMF network element). The communications apparatus may include a processing unit and a sending unit. The processing unit is configured to determine that user plane reconfiguration of the terminal device is completed. The sending unit is configured to send the information about the user plane network element to the gateway or the terminal device.

Optionally, the sending unit is further configured to send user plane change indication information to the gateway or the terminal device.

Optionally, the information about the user plane network element includes at least one of the following: an identifier of the user plane network element and/or location information of the user plane network element.

For beneficial effects of the communications apparatus provided in the eighth aspect and each possible implementation of the eighth aspect, refer to the beneficial effects brought by the fourth aspect and each possible implementation of the fourth aspect. Details are not described herein again.

According to a ninth aspect, an embodiment of this application provides a communications apparatus. The communications apparatus includes a processor and a memory.

The memory is configured to store computer executable program code. The program code includes an instruction. When the processor executes the instruction, the instruction enables the communications apparatus to perform the method provided in the first aspect or each possible implementation of the first aspect.

According to a tenth aspect, an embodiment of this application provides a communications apparatus. The communications apparatus includes a processor, a memory, a receiver, and a transmitter. Both the receiver and the transmitter are coupled to the processor. The processor controls a receiving action of the receiver, and the processor controls a sending action of the transmitter.

The memory is configured to store computer executable program code. The program code includes an instruction. When the processor executes the instruction, the instruction enables the communications apparatus to perform the method provided in the second aspect or each possible implementation of the second aspect.

According to an eleventh aspect, an embodiment of this application provides a communications apparatus. The communications apparatus includes a processor and a memory.

The memory is configured to store computer executable program code. The program code includes an instruction. When the processor executes the instruction, the instruction enables the communications apparatus to perform the method provided in the third aspect or each possible implementation of the third aspect.

According to a twelfth aspect, an embodiment of this application provides a communications apparatus. The communications apparatus includes a processor and a memory.

The memory is configured to store computer executable program code. The program code includes an instruction. When the processor executes the instruction, the instruction enables the communications apparatus to perform the method provided in the fourth aspect or each possible implementation of the fourth aspect.

According to a thirteenth aspect, an embodiment of this application provides a communications apparatus. The communications apparatus includes a unit, a module, or a circuit configured to perform the method provided in the first aspect or each possible implementation of the first aspect. The communications apparatus may be a gateway, or may be a module used in a gateway, for example, may be a chip used in the gateway.

According to a fourteenth aspect, an embodiment of this application provides a communications apparatus. The communications apparatus includes a unit, a module, or a circuit configured to perform the method provided in the second aspect or each possible implementation of the second aspect. The communications apparatus may be a terminal device, or may be a module used in a terminal device, for example, may be a chip used in the terminal device.

According to a fifteenth aspect, an embodiment of this application provides a communications apparatus. The communications apparatus includes a unit, a module, or a circuit configured to perform the method provided in the third aspect or each possible implementation of the third aspect. The communications apparatus may be a core network element, or may be a module used in a core network element, for example, may be a chip used in the core network element. The core network element may be an AMF network element, an SMF network element, or the like.

According to a sixteenth aspect, an embodiment of this application provides a communications apparatus. The communications apparatus includes a unit, a module, or a circuit configured to perform the method provided in the fourth aspect or each possible implementation of the fourth aspect. The communications apparatus may be a core network element, or may be a module used in a core network element, for example, may be a chip used in the core network element. The core network element may be an SMF network element or the like.

According to a seventeenth aspect, an embodiment of this application provides a computer program product including an instruction. When the computer program product is run on a computer, the computer is enabled to perform the method in the first aspect or each possible implementation of the first aspect.

According to an eighteenth aspect, an embodiment of this application provides a computer program product including an instruction. When the computer program product is run on a computer, the computer is enabled to perform the method in the second aspect or each possible implementation of the second aspect.

According to a nineteenth aspect, an embodiment of this application provides a computer program product including an instruction. When the computer program product is run on a computer, the computer is enabled to perform the method in the third aspect or each possible implementation of the third aspect.

According to a twentieth aspect, an embodiment of this application provides a computer program product including an instruction. When the computer program product is run on a computer, the computer is enabled to perform the method in the fourth aspect or each possible implementation of the fourth aspect.

According to a twenty-first aspect, an embodiment of this application provides a computer readable storage medium. The computer readable storage medium stores an instruction. When the instruction is run on a computer, the computer is enabled to perform the method in the first aspect or each possible implementation of the first aspect.

According to a twenty-second aspect, an embodiment of this application provides a computer readable storage medium. The computer readable storage medium stores an instruction. When the instruction is run on a computer, the computer is enabled to perform the method in the second aspect or each possible implementation of the second aspect.

According to a twenty-third aspect, an embodiment of this application provides a computer readable storage medium. The computer readable storage medium stores an instruction. When the instruction is run on a computer, the computer is enabled to perform the method in the third aspect or each possible implementation of the third aspect.

According to a twenty-fourth aspect, an embodiment of this application provides a computer readable storage medium. The computer readable storage medium stores an instruction. When the instruction is run on a computer, the computer is enabled to perform the method in the fourth aspect or each possible implementation of the fourth aspect.

According to the gateway handover method, the gateway reselection method, and the communications apparatus provided in the embodiments of this application, in the non-3GPP network architecture, when gateway handover needs to be performed on the terminal device, the source gateway of the terminal device or the terminal device may hand over the terminal device from the source gateway of the terminal device to the target gateway, to implement gateway handover in the non-3GPP network architecture, thereby expanding a use scenario of the non-3GPP network architecture.

DETAILED DESCRIPTION OF ILLUSTRATIVE EMBODIMENTS

In the embodiments of this application, a non-3GPP technology or a non-3GPP network indicates a technology or a network in which a terminal accesses a 3GPP core network by using a non-3GPP gateway (for example, an N3IWF network element). For example, the non-3GPP technology may be any one of the following: a wireless fidelity (Wi-Fi) technology, a worldwide interoperability for microwave access (WiMAX) technology, a code division multiple access (CDMA) technology, a wireless local area network (WLAN) technology, or a fixed network access technology.

Figure 1:
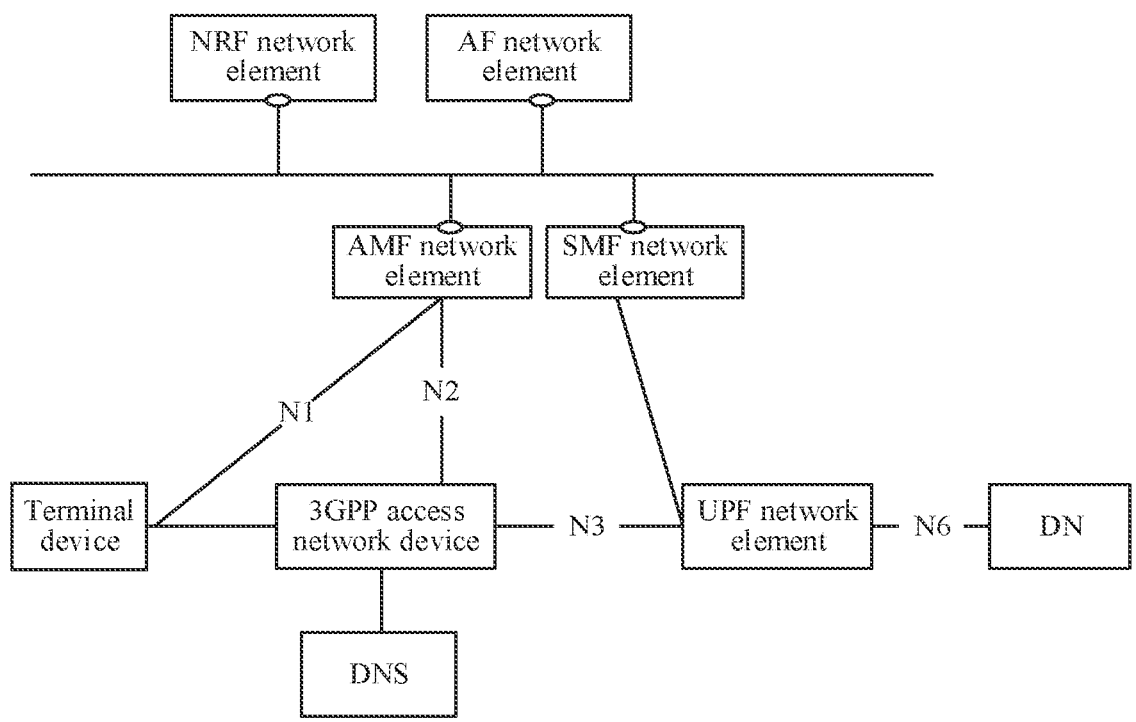
FIG. 1 is a diagram of a 5G network architecture according to an embodiment of this application.

FIG. 1 is a diagram of a 5G network architecture according to an embodiment of this application. In the network architecture, a terminal device may access a core network by using a 3GPP access network. The network architecture may include: the terminal device, an access network device supporting a 3GPP technology, a user plane function (UPF) network element, an access and mobility management function (AMF) network element, a session management function (SMF) network element, a network function repository function (NRF) network element, a data network (DN), a domain name server (DNS), and the like. A person skilled in the art may understand that the network architecture shown in FIG. 1 constitutes no limitation on the network architecture. In specific implementation, the network architecture may include more or fewer network elements than those shown in the figure, or a combination of some network elements, or the like.

The access network device is a network element on an access network side. The AMF network element, the SMF network element, the UPF network element, and the NRF network element are network elements (core network element for short) of the 3GPP core network. The terminal device, the access network device, the UPF network element, and the DN may be referred to as user plane network function network elements, and are mainly responsible for user data transmission. Another network element may be referred to as a control plane network function network element, and is mainly responsible for verification, authentication, registration management, session management, mobility management, policy control, and the like, to ensure reliable and stable user data transmission.

The terminal device may be user equipment (UE), a handheld terminal device, a notebook computer, a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal device, a handheld device having a wireless communication function, a computing device, a processing device connected to a wireless modem, a drone, a vehicle-mounted device, a wearable device, a terminal device in the Internet of things, a virtual reality device, a terminal device in a future 5G network, a terminal device in a future evolved public land mobile network (PLMN), or the like.

The foregoing described access network device supporting the 3GPP technology is an access device that is accessed in the network architecture by the terminal device in a wireless manner, and is mainly responsible for radio resource management on an air interface side, quality of service (QoS) management, data compression and encryption, and the like. For example, a base station NodeB, an evolved NodeB eNodeB, a base station in a 5G mobile communications system or a new radio (NR) communications system, a base station in a future mobile communications system, or the like.

The AMF network element may be configured to manage access of the terminal device to the core network, for example, access control of the terminal device, mobility management of the terminal device, and attachment and de-attachment of the terminal device. When the AMF network element provides a service for a session of the terminal device, the AMF network element may further provide a control plane storage resource for the session, to store a session identifier, an SMF network element identifier associated with the session identifier, and the like.

The SMF network element may be configured to: select a user plane network element for the terminal device, redirect the user plane network element for the terminal device, allocate an Internet protocol (IP) address to the terminal device, establish a bearer (also referred to as a session) between the terminal device and the UPF network element, and perform session modification, session release, and session QoS control.

The UPF network element may be configured to forward and receive user data of the terminal device. For example, the UPF network element may receive user data from the data network, and transmit the user data to the terminal device by using the access network device. The UPF network element may further receive user data from the terminal device by using the access network device, and forward the user data to the data network. A transmission resource allocated and scheduled by the UPF network element for the terminal device is managed and controlled by the SMF network element.

The NRF network element may support a service discovery function. The NRF network element is configured to: receive a network function discovery request, and provide information about an available network function instance to a requesting party. In addition, the NRF network element may further maintain information about an available network function instance and information about an instance support service.

The DNS may provide a gateway discovery function. The DNS is configured to: receive a gateway query request, and provide identification information of an available gateway to a requesting party. In addition, the DNS may further parse an IP address in a data service of the terminal device.

Figure 2:
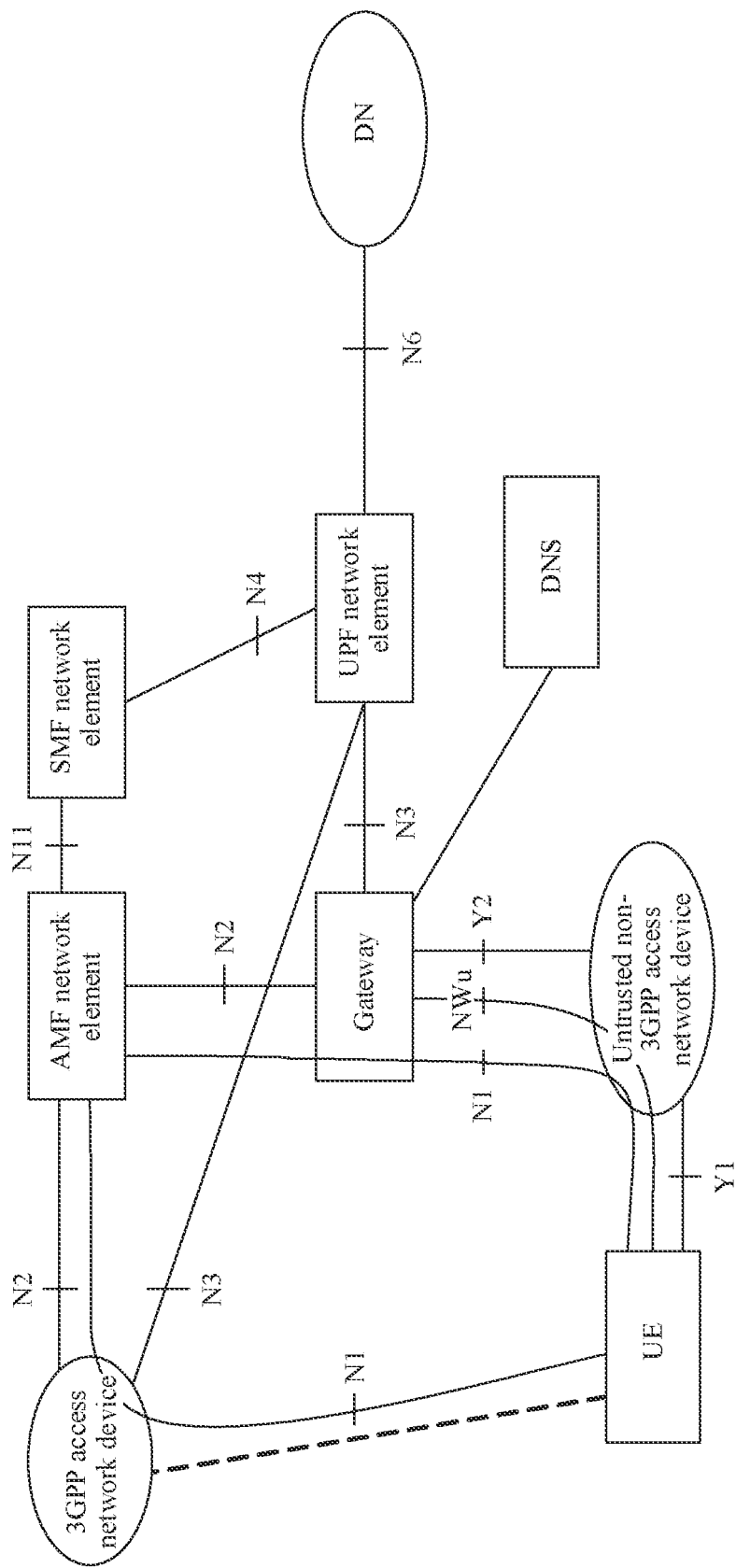
FIG. 2 is a diagram of another 5G network architecture according to an embodiment of this application.

FIG. 2 is a diagram of another 5G network architecture according to an embodiment of this application. As shown in FIG. 2, in the network architecture, a terminal device may access a core network by using a 3GPP technology and/or a non-3GPP technology. When the terminal device accesses the core network by using the 3GPP technology, the network device may access the core network by using the 3GPP access network device shown in FIG. 1 or a 3GPP access network device shown in FIG. 2. When the terminal device accesses the core network by using the non-3GPP technology, the terminal device may access the core network by using a non-3GPP access network device and a gateway shown in FIG. 2.

The foregoing described non-3GPP access network device may be, for example, a wireless access point (AP) in a wireless local area network (WLAN), a gateway device in WiMAX, a switch or a router in a CDMA network, or the like. The foregoing described gateway may be, for example, a non-3GPP interworking function (N3IWF) network element.

In this embodiment of this application, the gateway may be a network element on an access network side. For example, the network element may be an access network device. The gateway may alternatively be a network element on a core network side. In this embodiment of this application, an example in which the access network device and the gateway are separate devices is used for description.

In consideration of the foregoing problem, an embodiment of this application provides a gateway handover method, to implement gateway (for example, an N3IWF network element) handover in a non-3GPP network architecture. To be specific, a terminal device is handed over from a source gateway to a target gateway. It may be understood in the art that the method provided in this embodiment of this application includes but is not limited to the foregoing scenario of the non-3GPP network architecture shown in FIG. 2. In any scenario of accessing a 3GPP core network by using a gateway, the method provided in this embodiment of this application may be used. In addition, it should be noted that, in this embodiment of this application, gateway handover is a process defined from a perspective of the source gateway. Gateway reselection is a process defined from a perspective of the terminal device. However, essence of the two processes is handing over the terminal device from the source gateway to the target gateway.

In this embodiment of this application, gateway handover may be implemented in a manner in which the source gateway hands over the terminal device from the source gateway to the target gateway, or gateway handover may be implemented in a manner in which the terminal device performs reselection on the terminal device from the source gateway to the target gateway. The following describes the method in this embodiment of this application in detail separately from the perspective of the source gateway and the perspective of the terminal device based on the non-3GPP network architecture shown in FIG. 2. The following several embodiments may be combined with each other, and the same or similar concepts or processes may not be described repeatedly in some embodiments.

Figure 3:
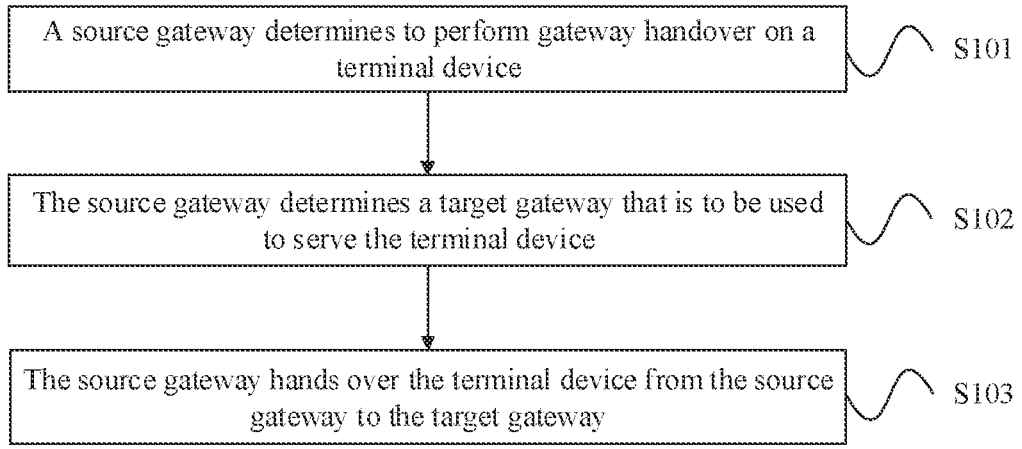
FIG. 3 is a flowchart of a gateway handover method according to an embodiment of this application.

FIG. 3 is a flowchart of a gateway handover method according to an embodiment of this application. This embodiment relates to a specific process in which a source gateway hands over a terminal device in a connected mode from the source gateway to a target gateway. As shown in FIG. 3, the method includes the following steps:

S101. The source gateway determines to perform gateway handover on the terminal device.

S102. The source gateway determines the target gateway that is to be used to serve the terminal device.

S103. The source gateway hands over the terminal device from the source gateway to the target gateway.

Specifically, the source gateway may determine to perform gateway handover on the terminal device in the following manners:

Manner 1: A core network element identifies whether the terminal device exceeds a service area of the source gateway, and sends indication information to the source gateway when the terminal device exceeds the service area of the source gateway. The source gateway determines, based on the indication information sent by the core network element, to perform gateway handover on the terminal device. Herein, the core network element may be, for example, any core network element that can identify whether the terminal device exceeds the service area of the source gateway, for example, an AMF network element or an SMF network element. Actions of identifying whether the terminal device exceeds the service area of the source gateway and indicating the source gateway by using the indication information when the terminal device exceeds the service area of the source gateway may be alternatively performed by a third-party network element. This is not limited in this embodiment of this application.

Specifically, the core network element may obtain location information of the terminal device. Herein, the location information of the terminal device may be, for example, any information used to indicate a location of the terminal device, for example, a tracking area (tracking area identifier, TAI) in which the terminal device is located, a location area identifier (LAI) of the terminal device, a public land mobile network identifier (PLMN ID) of the terminal device, a cell identifier (CI) of the terminal device, latitude and longitude coordinates of the location of the terminal device, a city address of the terminal device, or an identifier of an access network device accessed by the terminal device. That the access network device is an AP is used as an example. Herein, the identifier of the access network device may be, for example, a basic service set identifier (BSSID) or a service set identifier (SSID) of the AP.

This embodiment does not limit a manner in which the core network element obtains the location information of the terminal device. For example, the core network element may obtain the location information of the terminal device through receiving the location information from the terminal device. For example, the core network element may receive the location information from the terminal device by using an existing registration procedure, a positioning procedure, and the like. Details are not described herein. Alternatively, the core network element may send, to the terminal device, a request message used to request the location information, to receive a response message that is returned by the terminal device for the request message. The response message may carry the location information of the terminal device.

In this embodiment, configuration information of the source gateway may be preset in the core network element. Therefore, after obtaining the location information of the terminal device, the core network element may determine, based on the location information of the terminal device and the configuration information of the source gateway, whether to perform gateway handover on the terminal device. The configuration information may be the service area of the source gateway or an address of the source gateway. That the configuration information is the service area of the source gateway is used as an example. The core network element may determine, based on the location information of the terminal device and the service area of the source gateway, whether the terminal device exceeds the service area of the source gateway. If determining that the terminal device exceeds the service area of the source gateway, the core network element determines to perform gateway handover on the terminal device. If determining that the terminal device does not exceed the service area of the source gateway, the core network element determines not to perform gateway handover on the terminal device. That the configuration information is the address of the source gateway is used as an example. The core network element may determine, based on the location information of the terminal device and the address of the source gateway, a distance between the terminal device and the source gateway. When the distance is greater than a preset threshold, it indicates that the terminal device exceeds the service area of the source gateway. In this case, the core network element determines to perform gateway handover on the terminal device. If the distance is less than or equal to a preset threshold, it indicates that the terminal device does not exceed the service area of the source gateway. In this case, the core network element determines not to perform gateway handover on the terminal device.

After determining to perform gateway handover on the terminal device, the core network element may send the indication information to the source gateway to indicate to perform gateway handover on the terminal device. In this way, the source gateway may determine, based on the indication information, to perform gateway handover on the terminal device. This embodiment does not limit how the indication information indicates to perform gateway handover on the terminal device. For example, the indication information may indicate to perform gateway handover on the terminal device in a manner of carrying identification information of the terminal device.

In some embodiments, after receiving the indication information sent by the core network element, the source gateway may further send an acknowledgment message to the core network element, to indicate that the source gateway has received the indication information.

After determining to perform gateway handover on the terminal device, the source gateway may determine, in the following manners, the target gateway that is to be used to serve the terminal device.

For example, gateway configuration information is stored in the source gateway. The gateway configuration information may include identification information of a candidate gateway and location information of the candidate gateway. For example, the gateway configuration information may include identification information and location information of all candidate gateways in a serving domain in which the source gateway is located. Herein, the serving domain may be understood as an area in which a gateway to which gateway handover can be performed from the source gateway is located. In other words, gateway handover cannot be performed between the source gateway and a gateway that exceeds this area. Correspondingly, gateways in the same serving domain may implement load balancing, serve as a redundancy backup for each other, and the like.

In this implementation, the source gateway may determine the target gateway based on the location information of the terminal device and the gateway configuration information. For example, the source gateway may determine a distance between each candidate gateway in the gateway configuration information and the terminal device based on the location information of the terminal device and the gateway configuration information; and use a candidate gateway closest to the terminal device as the target gateway. In this manner, a delay of accessing the 3GPP core network can be shortened.

For another example, the gateway configuration information is stored in a domain name server. In this implementation, the source gateway may send a request message to the domain name server to request the target gateway. The request message may include the foregoing described location information of the terminal device, or the request message may include a fully qualified domain name (FQDN) constructed by using the PLMN ID of the terminal device, or the request message may include an FQDN constructed by using the PLMN ID of the terminal device and the TAI of the terminal device, or the request message may include an FQDN constructed by using the PLMN ID of the terminal device and the LAI of the terminal device.

Correspondingly, after receiving the request message, the domain name server may learn of the location information of the terminal device based on the request message, to determine the target gateway based on the location information of the terminal device and gateway configuration information; and send identification information of the target gateway to the source gateway. For example, the domain name server may determine a distance between each candidate gateway in the gateway configuration information and the terminal device based on the location information of the terminal device and the gateway configuration information; and use a candidate gateway closest to the terminal device as the target gateway. Then, the domain name server may send the identification information of the target gateway to the source gateway, so that the source gateway determines, based on the identification information of the target gateway, the target gateway that is to be used to serve the terminal device. Optionally, the identification information of the target gateway in this embodiment of this application may be, for example, an IP address of the target gateway.

For another example, the gateway configuration information is stored in an NRF network element. In this implementation, the source gateway may send a request message to the NRF network element to request the target gateway. For a description of the request message, refer to the request message sent to the domain name server. Correspondingly, after receiving the request message, the NRF network element may learn of the location information of the terminal device based on the request message, to determine the target gateway based on the location information of the terminal device and gateway configuration information; and send identification information of the target gateway to the source gateway. For example, the NRF network element may determine a distance between each candidate gateway in the gateway configuration information and the terminal device based on the location information of the terminal device and the gateway configuration information; and use a candidate gateway closest to the terminal device as the target gateway. Then, the NRF network element may send the identification information of the target gateway to the source gateway, so that the source gateway determines, based on the identification information of the target gateway, the target gateway that is to be used to serve the terminal device.

Optionally, in some embodiments, the request message sent to the NRF network element may further carry other information, for example, a requested network function name or service name, so that the NRF network element can further accurately select the target gateway for the terminal device with reference to the network function name or the service name. Herein, the network function name may be, for example, a network function currently required by the terminal device, and the foregoing described service name may be, for example, a service currently required by the terminal device.

Manner 2: The source gateway identifies whether the terminal device exceeds a service area of the source gateway, and determines to perform gateway handover on the terminal device when the terminal device exceeds the service area of the source gateway.

The source gateway may determine, based on obtained location information of the terminal device and configuration information of the source gateway, whether the terminal device exceeds the service area of the source gateway, and further determine whether to perform gateway handover on the terminal device. For a description of how to determine, based on the location information of the terminal device and the configuration information of the source gateway, to perform gateway handover on the terminal device, refer to the description in Manner 1. An implementation of Manner 2 is similar to that of Manner 1. Details are not described herein again.

This embodiment does not limit a manner in which the source gateway obtains the location information of the terminal device. For example, the source gateway may obtain the location information of the terminal device through receiving the location information from the terminal device. For example, the source gateway may send, to the terminal device, a request message used to request the location information. Then, the source gateway may receive a response message that is returned by the terminal device for the request message. The response message may carry the location information of the terminal device. For another example, the source gateway may obtain the location information of the terminal device through receiving the location information from a core network element. For example, the source gateway may send, to the core network element, a request message that is specifically used to request the location information of the terminal device. Then, the source gateway may receive a response message that is returned by the core network element for the request message. The response message may carry the location information of the terminal device. Herein, the core network element may be any core network element that stores the location information of the terminal device, for example, an AMF network element, an SMF network element, or a UPF network element.

Optionally, the source gateway may further determine, based on a delay between the terminal device and the source gateway, whether the terminal device exceeds the service area of the source gateway. For example, when the delay between the terminal device and the source gateway is greater than or equal to a preset delay threshold, it is determined that the terminal device exceeds the service area of the source gateway, and gateway handover needs to be performed on the terminal device. When the delay between the terminal device and the source gateway is less than a preset delay threshold, it is determined that the terminal device does not exceed the service area of the source gateway, and gateway handover does not need to be performed on the terminal device.

This embodiment does not limit a manner in which the source gateway obtains the delay between the terminal device and the source gateway. For example, the source gateway may receive a delay parameter that is between the terminal device and the source gateway and that is sent by the terminal device. Alternatively, the terminal device may compare the delay with the preset delay threshold after detecting the delay between the terminal device and the source gateway. When the delay is greater than or equal to the preset delay threshold, the terminal device sends indication information to the source gateway. The indication information is used to indicate the source gateway to perform gateway handover, or indicate that the delay between the terminal device and the source gateway is greater than or equal to the preset delay threshold.

After determining to perform gateway handover on the terminal device, the source gateway may determine the target gateway that is to be used to serve the terminal device. For a description of a process in which the source gateway determines the target gateway that is to be used to serve the terminal device, refer to the description in Manner 1. Details are not described herein again.

Manner 3: During user plane reconfiguration of the terminal device, the source gateway determines to perform gateway handover on the terminal device.

Figure 4:
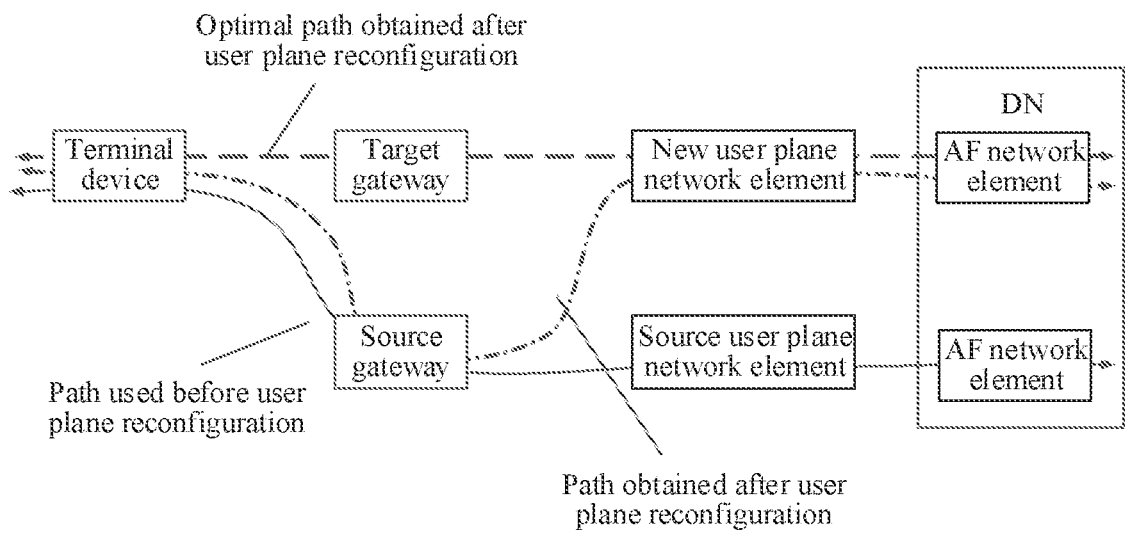
FIG. 4 is a schematic diagram of an application scenario according to an embodiment of this application.

FIG. 4 is a schematic diagram of an application scenario according to an embodiment of this application. As shown in FIG. 4, when the terminal device executes some procedures, for example, a service request (SR) procedure, a protocol data unit (PDU) session reestablishment procedure, and an application function influence (AF influence) procedure, a core network element reconfigures a user plane of the terminal device. In this case, a user plane network element corresponding to the terminal device changes. After the user plane network element changes, a path (that is, a path obtained after the user plane reconfiguration) in which the terminal device communicates with a new user plane network element by using the source gateway may not be an optimal path, which causes a relatively large delay of data transmission between the terminal device and the new user plane network element. Therefore, after the user plane reconfiguration of the terminal device, the source gateway may obtain, based on location information of the terminal device and information about the user plane network element (referred to as: the new user plane network element) currently corresponding to the terminal device, a gateway that the terminal device expects to access. If the gateway that the terminal device expects to access is different from the source gateway, it indicates that the path in which the terminal device communicates with the new user plane network element by using the source gateway is not an optimal path, and it is determined to perform gateway handover on the terminal device. If the gateway that the terminal device expects to access is the same as the source gateway, it indicates that the path in which the terminal device communicates with the new user plane network element by using the source gateway is an optimal path, and it is determined not to perform gateway handover on the terminal device. Herein, the information about the user plane network element may include, for example, an identifier of the user plane network element and/or location information of the user plane network element.

In specific implementation, the source gateway may obtain, in the following manners, the gateway that the terminal device expects to access.

For example, gateway configuration information is stored in the source gateway. The gateway configuration information may include identification information of a candidate gateway and location information of the candidate gateway. For example, the gateway configuration information may include identification information and location information of all candidate gateways in a serving domain in which the source gateway is located. In this implementation, the source gateway may determine, based on the location information of the terminal device, the information about the new user plane network element, and the gateway configuration information, the gateway that the terminal device expects to access. For example, the source gateway may determine, based on the location information of the terminal device, the information about the new user plane network element, and the gateway configuration information, the path in which the terminal device communicates with the new user plane network element by using each candidate gateway in the gateway configuration information; and use, as the gateway that the terminal device expects to access, a candidate gateway by using which a path from the terminal device to the new user plane network element is the shortest.

For another example, the gateway configuration information is stored in a domain name server. In this implementation, the source gateway may send a request message to the domain name server to request the gateway that the terminal device expects to access. The request message may include the foregoing described location information of the terminal device and the information about the new user plane network element, or the request message may include a fully qualified domain name (FQDN) constructed by using a PLMN ID of the terminal device and the information about the new user plane network element, or the request message may include an FQDN constructed by using a PLMN ID of the terminal device, a TAI of the terminal device, and the information about the new user plane network element, or the request message may include an FQDN constructed by using a PLMN ID of the terminal device, a LAI of the terminal device, and the information about the new user plane network element.

Correspondingly, after receiving the request message, the domain name server may learn of the location information of the terminal device and the information about the new user plane network element based on the request message, to determine, based on the location information of the terminal device, the information about the new user plane network element, and the gateway configuration information, the gateway that the terminal device expects to access; and send, to the source gateway, the identification information of the gateway that the terminal device expects to access. For example, the domain name server may determine, based on the location information of the terminal device, the information about the new user plane network element, and the gateway configuration information, the path in which the terminal device communicates with the new user plane network element by using each candidate gateway in the gateway configuration information; and use, as the gateway that the terminal device expects to access, a candidate gateway by using which a path from the terminal device to the new user plane network element is the shortest. Then, the domain name server may send, to the source gateway, identification information of the gateway that the terminal device expects to access. In this way, the source gateway may obtain, based on the identification information of the gateway that the terminal device expects to access, the gateway that the terminal device expects to access. Optionally, the identification information of the gateway that the terminal expects to access in this embodiment of this application may be, for example, an IP address of the gateway that the terminal device expects to access.

For another example, the gateway configuration information is stored in an NRF network element. In this implementation, the terminal device may send a request message to the NRF network element to request the gateway that the terminal device expects to access. The request message may include the foregoing described location information of the terminal device and the information about the new user plane network element, or the request message may include a fully qualified domain name (FQDN) constructed by using a PLMN ID of the terminal device and the information about the new user plane network element, or the request message may include an FQDN constructed by using a PLMN ID of the terminal device, a TAI of the terminal device, and the information about the new user plane network element, or the request message may include an FQDN constructed by using a PLMN ID of the terminal device, a LAI of the terminal device, and the information about the new user plane network element.

Correspondingly, after receiving the request message, the NRF network element may learn of the location information of the terminal device and the information about the new user plane network element based on the request message, to determine, based on the location information of the terminal device, the information about the new user plane network element, and the gateway configuration information, the gateway that the terminal device expects to access; and send, to the terminal device, identification information of the gateway that the terminal device expects to access. For example, the NRF network element may determine, based on the location information of the terminal device, the information about the new user plane network element, and the gateway configuration information, the path in which the terminal device communicates with the new user plane network element by using each candidate gateway in the gateway configuration information; and use, as the gateway that the terminal device expects to access, a candidate gateway by using which a path from the terminal device to the new user plane network element is the shortest. Then, the NRF network element may send, to the source gateway, the identification information of the gateway that the terminal device expects to access. In this way, the source gateway may obtain, based on the identification information of the gateway that the terminal device expects to access, the gateway that the terminal device expects to access.

After the source gateway obtains, in the foregoing manner, the gateway that the terminal device expects to access, the source gateway may compare the source gateway with the gateway that the terminal device expects to access; and if the gateway that the terminal device expects to access is different from the source gateway, determine to perform gateway handover on the terminal device. In this implementation, the source gateway may use, as the target gateway, the gateway that the terminal device expects to access. In this manner, a delay of data transmission between the terminal device and the new user plane network element can be shortened.

This embodiment does not limit the foregoing manner in which the source gateway obtains the information about the new user plane network element. For example, the core network element may send the information about the new user plane network element to the source gateway, so that the source gateway obtains the information about the new user plane network element, to implicitly trigger the source gateway to perform the foregoing operations. Optionally, in some embodiments, when sending the information about the new user plane network element to the source gateway, the core network element further sends user plane change indication information to the source gateway, to explicitly indicate that the user plane network element corresponding to the terminal device changes. Herein, the core network element may be, for example, any core network element that reconfigures a user plane of the terminal device, for example, an SMF network element.

This embodiment also does not limit a manner in which the source gateway obtains the location information of the terminal device. For example, the source gateway may obtain the location information of the terminal device in the manner shown Manner 2. In some embodiments, when sending the information about the user plane network element to the source gateway, the core network element may further send the location information of the terminal device to the source gateway at the same time, so that the source gateway can obtain the location information of the terminal device.

In addition, in some embodiments, the core network element may send data network access identifier (DNAI) information to the source gateway. The DNAI information is used to indicate location information of an AF network element in a data network. Therefore, the source gateway may further obtain, with reference to the DNAI information and the terminal, the gateway that the terminal device expects to access; and when the gateway that the terminal device expects to access is different from the source gateway, hand over the terminal device from the source gateway to the gateway that the terminal device expects to access, to ensure a better communication path between the terminal device and the data network. This implementation is similar to the foregoing implementation performed based on the information about the user plane network element. Details are not described herein. In this manner, the source gateway may perform gateway handover on the terminal device based on the DNAI information when the source gateway cannot obtain the information about the user plane network element, thereby expanding an application scenario and an implementation of the gateway handover. In specific implementation, the DNAI information may be replaced with other information used to indicate location information of the AF network element, to implement this method embodiment. Details are not described.

Manner 4: The source gateway determines to perform gateway handover on the terminal device based on a load amount of the source gateway.

In a possible implementation, the source gateway may obtain the load amount of the source gateway. The load amount may be a quantity of terminal devices that access a core network by using the source gateway. For example, when a quantity of terminal devices that access the 3GPP core network by using the source gateway is greater than or equal to a preset quantity threshold, the source gateway may determine that gateway handover is performed on some terminal devices to balance loads of gateways. In another possible implementation, the source gateway may obtain a load amount of another gateway. For example, when loads of gateways that are located in the same serving domain as the source gateway are unbalanced, and the load amount of the source gateway is greater than the load amount of the another gateway, the source gateway may determine that gateway handover is performed on some terminal devices.

This embodiment does not limit how the source gateway determines the terminal device that requires gateway handover. For example, the source gateway may randomly select some terminal devices to perform gateway handover, or the source gateway selects some terminal devices to perform gateway handover based on policy information.

After determining to perform gateway handover on the terminal device, the source gateway may determine, in the following manners, the target gateway that is to be used to serve the terminal device.

For example, the gateway configuration information is stored in the source gateway. The gateway configuration information may include identification information of a candidate gateway, location information of the candidate gateway, and load information of the candidate gateway. For example, the gateway configuration information may include identification information, location information, and load information of all candidate gateways in the serving domain in which the source gateway is located. Herein, the serving domain may be understood as an area in which a gateway to which gateway handover can be performed from the source gateway is located. In other words, gateway handover cannot be performed between the source gateway and a gateway that exceeds this area. Correspondingly, gateways in the same serving domain may implement load balancing, serve as a redundancy backup for each other, and the like.

In this implementation, the source gateway may determine the target gateway based on the location information of the terminal device and the gateway configuration information. For example, the source gateway may determine a distance between each candidate gateway in the gateway configuration information and the terminal device based on the location information of the terminal device and the gateway configuration information; and use, as the target gateway, a candidate gateway whose distance to the terminal device is less than or equal to a preset distance threshold and whose load is less than a preset load threshold.

For another example, the gateway configuration information is stored in a domain name server. In this implementation, the source gateway may send a request message to the domain name server to request the target gateway. Correspondingly, after receiving the request message, the domain name server may learn of the location information of the terminal device based on the request message, to determine the target gateway based on the location information of the terminal device and the gateway configuration information; and send identification information of the target gateway to the source gateway. For example, the domain name server may determine a distance between each candidate gateway in the gateway configuration information and the terminal device based on the location information of the terminal device and the gateway configuration information; and use, as the target gateway, a candidate gateway whose distance to the terminal device is less than or equal to a preset distance threshold and whose load is less than a preset load threshold. Then, the domain name server may send the identification information of the target gateway to the source gateway, so that the source gateway determines, based on the identification information of the target gateway, the target gateway that is to be used to serve the terminal device.

For another example, the gateway configuration information is stored in an NRF network element. In this implementation, the source gateway may send a request message to the NRF network element to request the target gateway. Correspondingly, after receiving the request message, the NRF network element may learn of the location information of the terminal device based on the request message, to determine the target gateway based on the location information of the terminal device and the gateway configuration information; and send the identification information of the target gateway to the source gateway. For example, the NRF network element may determine a distance between each candidate gateway in the gateway configuration information and the terminal device based on the location information of the terminal device and the gateway configuration information; and use, as the target gateway, a candidate gateway whose distance to the terminal device is less than or equal to a preset distance threshold and whose load is less than a preset load threshold. Then, the NRF network element may send identification information of the target gateway to the source gateway, so that the source gateway determines, based on the identification information of the target gateway, the target gateway that is to be used to serve the terminal device.

Optionally, in some embodiments, the request message sent to the NRF network element may further carry other information, for example, a requested network function name or service name, so that the NRF network element can further accurately select the target gateway for the terminal device with reference to the network function name or the service name. Herein, the network function name may be, for example, a network function currently required by the terminal device, and the foregoing described service name may be, for example, a service currently required by the terminal device.

The source gateway determines, in any one of Manner 1 to Manner 4, to perform gateway handover on the terminal device, and determines the target gateway that is to be used to serve the terminal device. Then, the source gateway may hand over the terminal device from the source gateway to the target gateway. For example, when connectivity exists between the source gateway and the target gateway, the source gateway may hand over the terminal device from the source gateway to the target gateway by using an interface between the source gateway and the target gateway or by using an N2 interface (that is, by using an AMF network element). When connectivity does not exist between the source gateway and the target gateway, the source gateway may hand over the terminal device from the source gateway to the target gateway by using an N2 interface (that is, by using an AMF network element).

Figure 5:
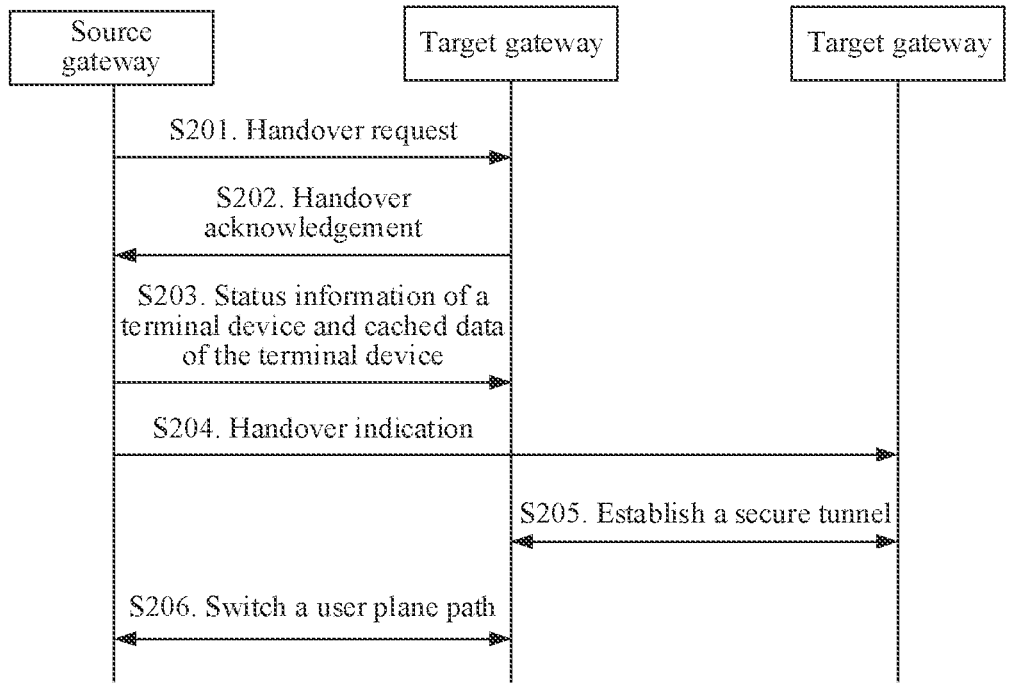
FIG. 5 is a flowchart of another gateway handover method according to an embodiment of this application.

As shown in FIG. 5, the following uses an example in which a source gateway may hand over a terminal device from the source gateway to a target gateway by using an interface between the source gateway and the target gateway, to describe how the source gateway hands over the terminal device from the source gateway to the target gateway. FIG. 5 is a flowchart of another gateway handover method according to an embodiment of this application. As shown in FIG. 5, step S103 may include the following steps:

S201. The source gateway sends a handover request to the target gateway.

The handover request may include identification information of the terminal device.

S202. The target gateway sends a handover acknowledgement to the source gateway.

The handover acknowledgement is used to indicate that the target gateway is ready for the handover. In this case, the target gateway implements access control of the terminal device.

S203. The source gateway sends status information of the terminal device and cached data of the terminal device to the target gateway.

S204. The source gateway sends a handover indication to the terminal device.

The handover indication is used to indicate the terminal device to establish a secure tunnel to the target gateway.

S205. The terminal device interacts with the target gateway to establish the secure tunnel.

S206. The source gateway interacts with the target gateway to switch a user plane path.

After step S206 is completed, the procedure ends.

It may be understood that the foregoing handover procedure shown in FIG. 5 is merely a schematic diagram. In specific implementation, more interaction or fewer steps may be included. This is not limited.

It should be noted that if a session of the terminal device does not need to be handed over when the terminal device is handed over from the source gateway to the target gateway, the source gateway may indicate the terminal device to initiate a session re-establishment procedure to the target gateway, to hand over the terminal device from the source gateway to the target gateway. Details are not described herein.

The following describes how the terminal device performs reselection on the terminal device from the source gateway to the target gateway.

Figure 6:
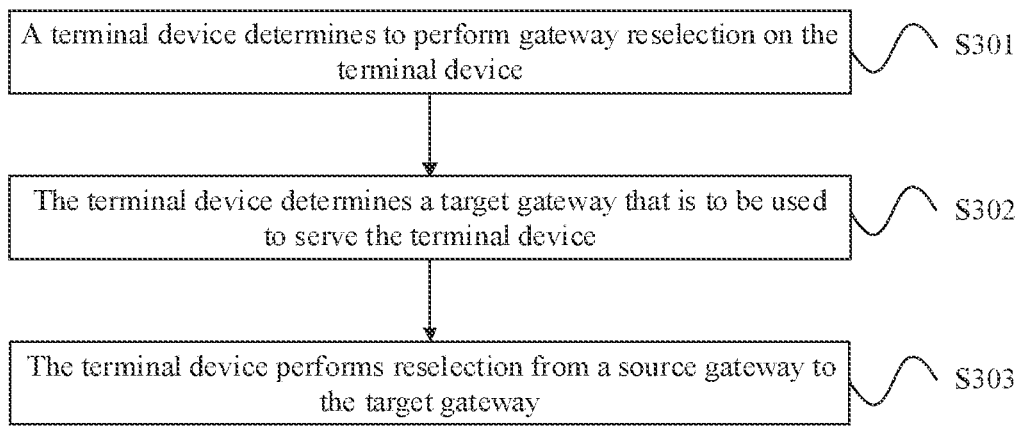
FIG. 6 is a flowchart of a gateway reselection method according to an embodiment of this application.

FIG. 6 is a flowchart of a gateway reselection method according to an embodiment of this application. As shown in FIG. 6, the method includes the following steps:

S301. A terminal device determines to perform gateway reselection on the terminal device.

S302. The terminal device determines a target gateway that is to be used to serve the terminal device.

S303. The terminal device performs reselection from a source gateway to the target gateway.

Specifically, the terminal device may determine to perform gateway reselection in the following manners:

Manner 1: The terminal device in an idle state may determine, based on a change of an access network device accessed by the terminal device, to perform gateway reselection on the terminal device.

In this embodiment, the terminal device may obtain identification information of the access network device accessed by the terminal device. For example, the terminal device may receive a broadcast message from the access network device. The broadcast message includes the identification information of the access network device. For example, the access network device is an AP. Herein, an identifier of the access network device may be, for example, an SSID and/or a BSSID of the AP. The terminal device may further obtain the identification information of the access network device by using another existing procedure.

Figure 6A:
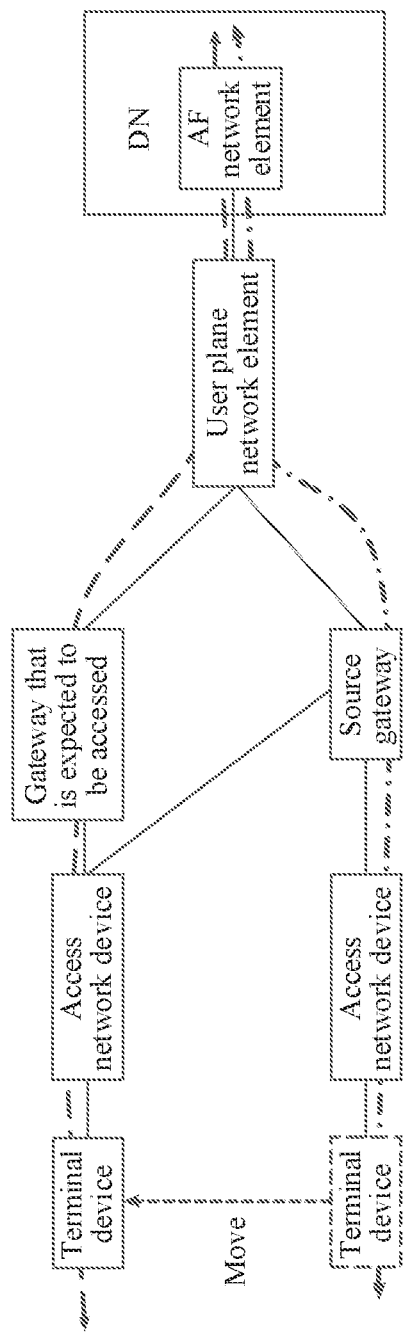
FIG. 6A is a schematic diagram of another application scenario according to an embodiment of this application.

After obtaining the identification information of the access network device accessed by the terminal device, the terminal device compares the identification information of the access network device currently accessed by the terminal device with previously stored identification information of an access network device, to determine whether the access network device accessed by the terminal device changes. FIG. 6A is a schematic diagram of another application scenario according to an embodiment of this application. As shown in FIG. 6A, if the accessed access network device does not change, it indicates that the terminal device is still located in a service area of the source gateway. Therefore, it may be determined not to perform gateway reselection on the terminal device. If it is determined that the access network device accessed by the terminal device changes, it indicates that the terminal device may have exceeded the service area of the source gateway. Therefore, a gateway that the terminal device expects to access may further be obtained to determine whether the terminal device has exceeded the service area of the source gateway. If the gateway that the terminal device expects to access is different from the source gateway, it indicates that the terminal device has exceeded the service area of the source gateway, and it is determined to perform gateway reselection on the terminal device. If the gateway that the terminal device expects to access is the same as the source gateway, it indicates that the terminal device does not exceed the service area of the source gateway, and it is determined not to perform gateway reselection on the terminal device.

In specific implementation, the terminal device may obtain, in the following manners, the gateway that the terminal device expects to access.

For example, gateway configuration information is stored in the terminal device. The gateway configuration information may include identification information of a candidate gateway and location information of the candidate gateway. For example, the gateway configuration information may include identification information and location information of all candidate gateways in a serving domain in which the source gateway is located. In this implementation, the terminal device may determine, based on location information of the terminal device and the gateway configuration information, the gateway that the terminal device expects to access. For example, the terminal device may determine a distance between each candidate gateway in the gateway configuration information and the terminal device based on the location information of the terminal device and the gateway configuration information; and use a candidate gateway closest to the terminal device as the gateway that the terminal device expects to access.

For another example, gateway configuration information is stored in a domain name server. In this implementation, the terminal device may send a request message to the domain name server to request the target gateway. The request message may include the foregoing described location information of the terminal device, or the request message may include a fully qualified domain name (FQDN) constructed by using a PLMN ID of the terminal device, or the request message may include an FQDN constructed by using a PLMN ID of the terminal device and a TAI of the terminal device, or the request message may include an FQDN constructed by using a PLMN ID of the terminal device and a LAI of the terminal device.

Correspondingly, after receiving the request message, the domain name server may learn of the location information of the terminal device based on the request message, to determine, based on the location information of the terminal device and the gateway configuration information, the gateway that the terminal device expects to access; and send, to the terminal device, identification information of the gateway that the terminal device expects to access. For example, the domain name server may determine a distance between each candidate gateway in the gateway configuration information and the terminal device based on the location information of the terminal device and the gateway configuration information; and use a candidate gateway closest to the terminal device as the gateway that the terminal device expects to access. Then, the domain name server may send, to the terminal device, the identification information of the gateway that the terminal device expects to access. In this way, the terminal device may obtain, based on the identification information of the gateway that the terminal device expects to access, the gateway that the terminal device expects to access.

After the terminal device obtains, in the foregoing manner, the gateway that the terminal device expects to access, the terminal device may compare the source gateway with the gateway that the terminal device expects to access; and if the gateway that the terminal device expects to access is different from the source gateway, determine to perform gateway reselection on the terminal device. In this implementation, the terminal device may use, as the target gateway, the gateway that the terminal device expects to access.

Manner 2: During user plane reconfiguration of the terminal device, the terminal device in a connected mode determines to perform gateway reselection.

As described in the foregoing embodiment, a core network element reconfigures a user plane of the terminal device, which may cause a change of a user plane network element corresponding to the terminal device. After the user plane network element changes, a path in which the terminal device communicates with a new user plane network element by using the source gateway may not be an optimal path, which causes a relatively large delay of data transmission between the terminal device and the new user plane network element. Therefore, after the user plane reconfiguration, the terminal device may obtain, based on location information of the terminal device and information about the currently corresponding user plane network element, a gateway that the terminal device expects to access. If the gateway that the terminal device expects to access is different from the source gateway, it indicates that the path in which the terminal device communicates with the new user plane network element by using the source gateway is not an optimal path, and it is determined to perform gateway reselection on the terminal device. If the gateway that the terminal device expects to access is the same as the source gateway, it indicates that the path in which the terminal device communicates with the new user plane network element by using the source gateway is an optimal path, and it is determined not to perform gateway reselection on the terminal device. Herein, the information about the user plane network element may include, for example, an identifier of the user plane network element and/or location information of the user plane network element.

In specific implementation, the terminal device may obtain, in the following manners, the gateway that is expected to be accessed.

For example, gateway configuration information is stored in the terminal device. The gateway configuration information may include identification information of a candidate gateway and location information of the candidate gateway. For example, the gateway configuration information may include identification information and location information of all candidate gateways in a serving domain in which the source gateway is located. In this implementation, the terminal device may determine, based on the location information of the terminal device, the information about the new user plane network element, and the gateway configuration information, the gateway that is expected to be accessed. For example, the terminal device may determine, based on the location information of the terminal device, the information about the new user plane network element, and the gateway configuration information, the path in which the terminal device communicates with the new user plane network element by using each candidate gateway in the gateway configuration information; and use, as the gateway that is expected to be accessed, a candidate gateway by using which a path from the terminal device to the new user plane network element is the shortest.

For another example, gateway configuration information is stored in a domain name server. In this implementation, the terminal device may send a request message to the domain name server to request the gateway that is expected to be accessed. The request message may include the foregoing described location information of the terminal device and the information about the new user plane network element, or the request message may include a fully qualified domain name (FQDN) constructed by using a PLMN ID of the terminal device and the information about the new user plane network element, or the request message may include an FQDN constructed by using a PLMN ID of the terminal device, a TAI of the terminal device, and the information about the new user plane network element, or the request message may include an FQDN constructed by using a PLMN ID of the terminal device, a LAI of the terminal device, and the information about the new user plane network element.

Correspondingly, after receiving the request message, the domain name server may learn of the location information of the terminal device and the information about the new user plane network element based on the request message, to determine, based on the location information of the terminal device, the information about the new user plane network element, and the gateway configuration information, the gateway that the terminal device expects to access; and send, to the terminal device, identification information of the gateway that the terminal device expects to access. For example, the domain name server may determine, based on the location information of the terminal device, the information about the new user plane network element, and the gateway configuration information, the path in which the terminal device communicates with the new user plane network element by using each candidate gateway in the gateway configuration information; and use, as the gateway that the terminal device expects to access, a candidate gateway by using which a path from the terminal device to the new user plane network element is the shortest. Then, the domain name server may send, to the terminal device, the identification information of the gateway that the terminal device expects to access. In this way, the terminal device may obtain, based on the identification information of the gateway that is expected to be accessed, the gateway that is expected to be accessed.

After the terminal device obtains, in the foregoing manner, the gateway that is expected to be accessed, the terminal device may compare the source gateway with the gateway that is expected to be accessed; and if the gateway that is expected to be accessed is different from the source gateway, determine to perform gateway reselection on the terminal device. In this implementation, the terminal device may use, as the target gateway, the gateway that is expected to be accessed. In this manner, a delay of data transmission between the terminal device and the new user plane network element can be shortened.

This embodiment does not limit the foregoing manner in which the terminal device obtains the information about the currently corresponding user plane network element. For example, the core network element may send the information about the new user plane network element to the terminal device, so that the terminal device obtains the information about the currently corresponding user plane network element, to implicitly trigger the source gateway to perform the foregoing operations. Optionally, in some embodiments, when sending the information about the new user plane network element to the terminal device, the core network element further sends user plane change indication information to the terminal device, to explicitly indicate that the user plane network element corresponding to the terminal device changes.

In addition, in some embodiments, the core network element may send DNAI information to the source gateway. The DNAI information is used to indicate location information of an AF network element in a data network. Therefore, the source gateway may further obtain, with reference to the DNAI information and the terminal, the gateway that the terminal device expects to access; and when the gateway that the terminal device expects to access is different from the source gateway, hand over the terminal device from the source gateway to the gateway that the terminal device expects to access, to ensure a better communication path between the terminal device and the data network. This implementation is similar to the foregoing implementation performed based on the information about the user plane network element. Details are not described herein. In this manner, the source gateway may perform gateway handover on the terminal device based on the DNAI information when the source gateway cannot obtain the information about the user plane network element, thereby expanding an application scenario and an implementation of the gateway handover. In specific implementation, the DNAI information may be replaced with other information used to indicate location information of the AF network element, to implement this method embodiment. Details are not described.

The terminal device determines, in either Manner 1 or Manner 2, to perform gateway reselection on the terminal device, and may perform reselection on the terminal device from the source gateway to the target gateway after determining the target gateway that is to be used to serve the terminal device. For example, the terminal device may perform reselection from the source gateway to the target gateway through an SR procedure. Alternatively, the terminal device may perform reselection from the source gateway to the target gateway through a registration update procedure. For example, the terminal device may send a registration update request to the target gateway. The registration update request includes a mobility registration update type, to indicate the terminal device to perform reselection from the source gateway to the target gateway based on the mobility update type.

It may be understood that for the foregoing related registration update procedure and SR procedure, refer to the prior art. Details are not described.

According to a network switching method provided in this embodiment of this application, in a non-3GPP network architecture, when gateway handover needs to be performed on the terminal device, the source gateway or the terminal device may hand over the terminal device from the source gateway to the target gateway, to implement gateway (for example, an N3IWF network element) handover in the non-3GPP network architecture, thereby expanding a use scenario of the non-3GPP network architecture.

The following uses an example in which the gateway is an N3IWF network element, to describe, by using some specific examples, the gateway handover method provided in this embodiment of this application.

Example 1: An AMF network element identifies whether a terminal device in a connected mode exceeds a service area of a source N3IWF network element. When the terminal device exceeds the service area of the source N3IWF network element, the AMF network element indicates the source N3IWF network element by using indication information, so that the source N3IWF network element performs N3IWF network element handover on the terminal device based on the indication information sent by the AMF network element.

Figure 7:
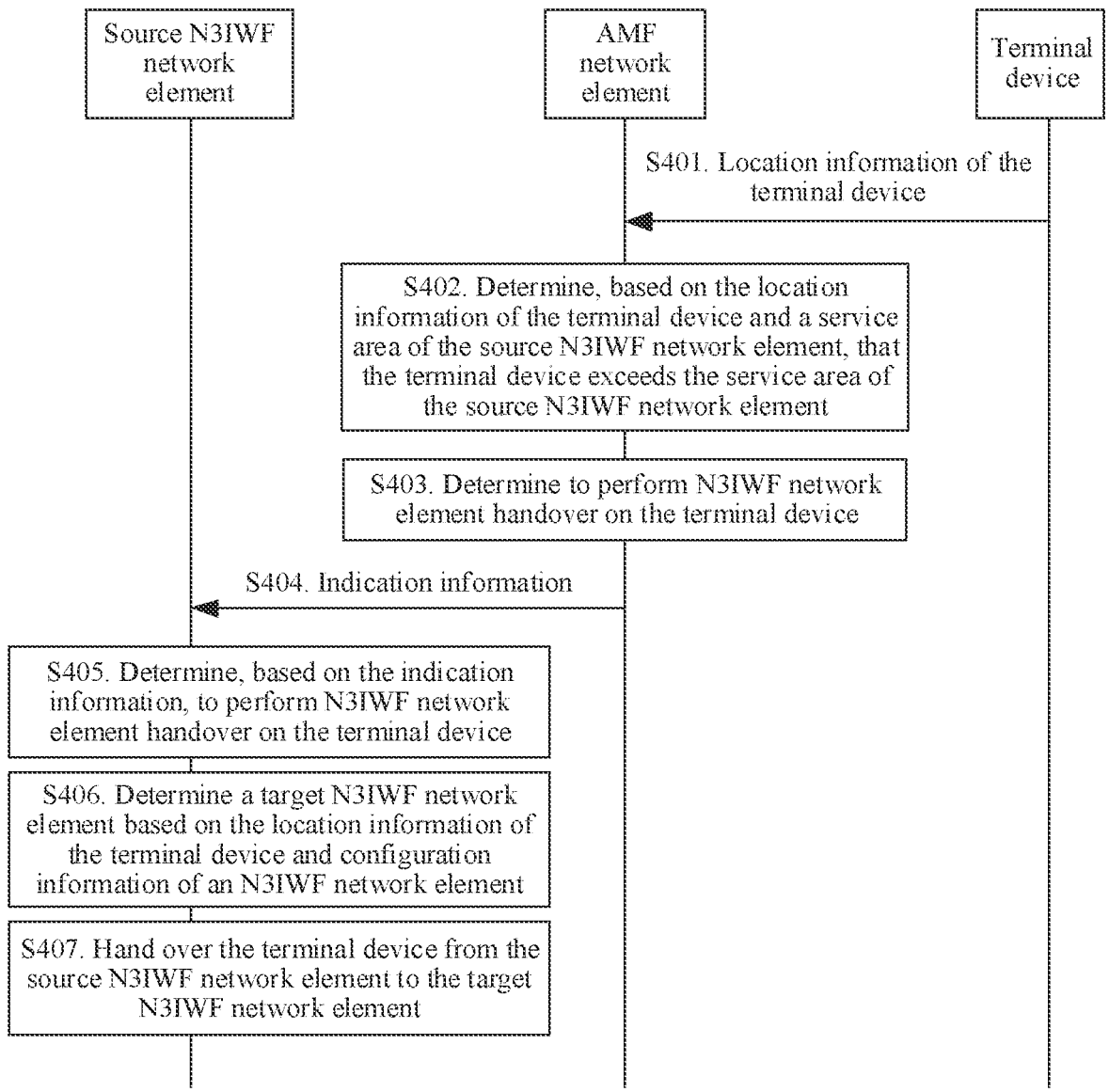
FIG. 7 is a flowchart of an N3IWF network element handover method according to an embodiment of this application.

FIG. 7 is a flowchart of an N3IWF network element handover method according to an embodiment of this application. As shown in FIG. 7, the method includes the following steps:

S401. A terminal device sends location information of the terminal device to an AMF network element.

S402. The AMF network element determines, based on the location information of the terminal device and a service area of a source N3IWF network element, that the terminal device exceeds the service area of the source N3IWF network element.

S403. The AMF network element determines to perform N3IWF network element handover on the terminal device.

S404. The AMF network element sends indication information to the source N3IWF network element.

The indication information is used to indicate to perform N3IWF network element handover on the terminal device.

S405. The source N3IWF network element determines, based on the indication information, to perform N3IWF network element handover on the terminal device.

Optionally, the method may further include: The source N3IWF network element sends acknowledgement information to the AMF network element. The acknowledgement information is used to indicate that the source N3IWF network element has received the indication information.

S406. The source N3IWF network element determines a target N3IWF network element based on the location information of the terminal device and configuration information of the N3IWF network element.

Optionally, step S406 may be replaced with the following steps:

S406a. The source N3IWF network element sends a request message to a domain name server. The request message is used to request a target N3IWF network element.

Optionally, the request message may include the location information of the terminal device.

S406b. The domain name server sends identification information of the target N3IWF network element to the source N3IWF network element.

S406c. The source N3IWF network element determines the target N3IWF network element based on the identification information of the target N3IWF network element.

Alternatively, step S406 may be replaced with the following steps:

S406d. The source N3IWF network element sends a request message to an NRF network element. The request message is used to request a target N3IWF network element.

Optionally, the request message may include the location information of the terminal device.

S406e. The NRF network element sends identification information of the target N3IWF network element to the source N3IWF network element.

S406f. The source N3IWF network element determines the target N3IWF network element based on the identification information of the target N3IWF network element.

Optionally, before step S406 is performed, the method may further include the following steps:

S406g. The source N3IWF network element sends, to the terminal device, a request message used to request the location information.

S406h. The terminal device sends, to the source N3IWF network element, a response message for the request message. The response message may carry the location information of the terminal device.

Alternatively, before step S406 is performed, the method may include the following steps:

S406i. The source N3IWF network element sends, to the AMF network element, a request message used to request the location information of the terminal device.

S406j. The AMF network element sends, to the source N3IWF network element, a response message for the request message. The response message may carry the location information of the terminal device.

S407. The source N3IWF network element hands over the terminal device from the source N3IWF network element to the target N3IWF network element.

After step S407 is completed, the procedure ends.

Example 2: A source N3IWF network element identifies, based on location information of a terminal device in a connected mode, whether the terminal device exceeds a service area of the source N3IWF network element; and when the terminal device exceeds the service area of the source N3IWF network element, performs N3IWF network element handover on the terminal device.

Figure 8:
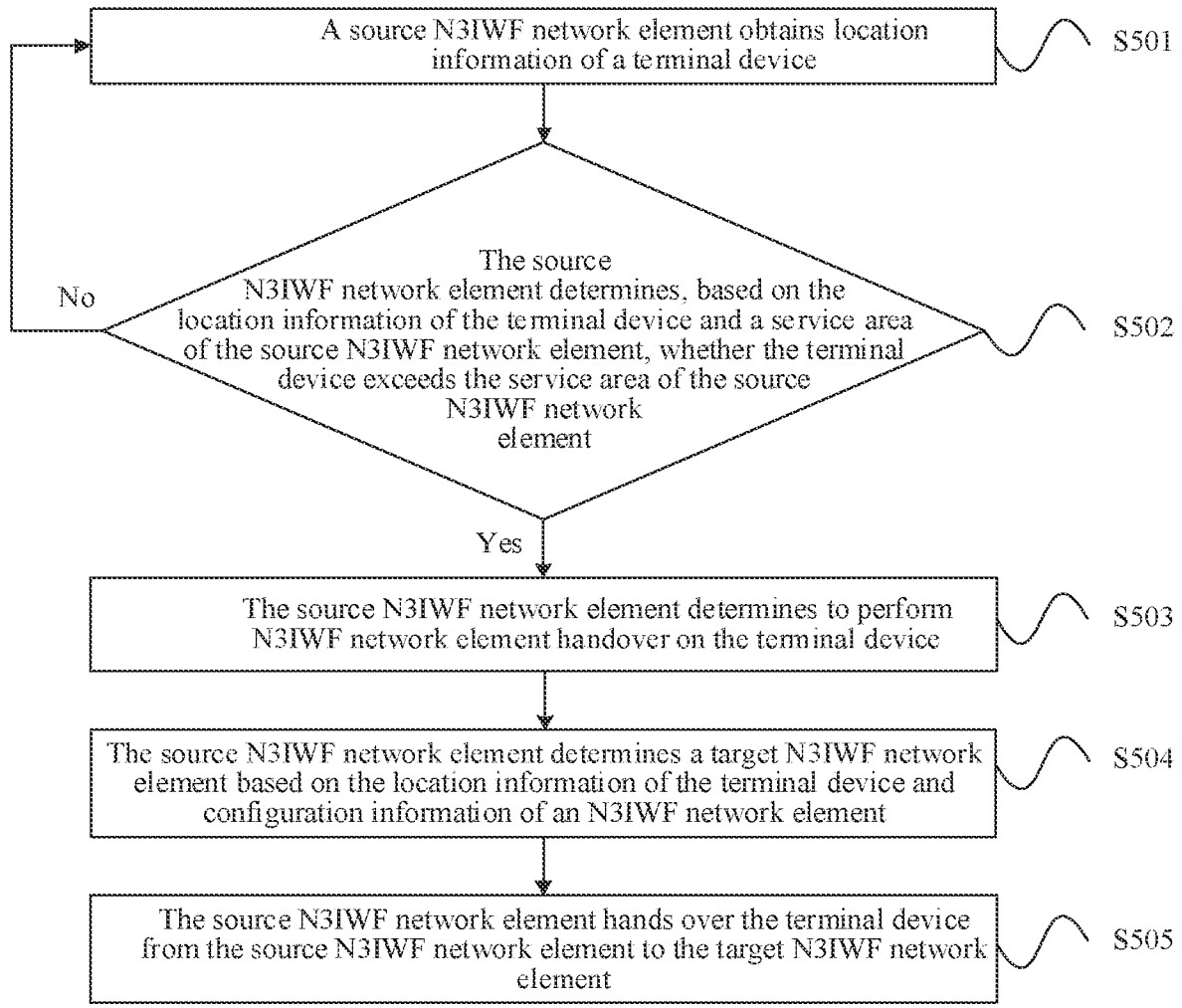
FIG. 8 is a flowchart of another N3IWF network element handover method according to an embodiment of this application.

FIG. 8 is a flowchart of another N3IWF network element handover method according to an embodiment of this application. As shown in FIG. 8, the method includes the following steps:

S501. A source N3IWF network element obtains location information of a terminal device.

Optionally, step S501 may be replaced with the following steps:

S501a. The source N3IWF network element sends, to the terminal device, a request message used to request the location information.

S501b. The terminal device sends, to the source N3IWF network element, a response message for the request message. The response message may carry the location information of the terminal device.

Alternatively, step S501 may be replaced with the following steps:

S501c. The source N3IWF network element sends, to an AMF network element, a request message used to request the location information of the terminal device.

S501d. The AMF network element sends, to the source N3IWF network element, a response message for the request message. The response message may carry the location information of the terminal device.

S502. The source N3IWF network element determines, based on the location information of the terminal device and a service area of the source N3IWF network element, whether the terminal device exceeds the service area of the source N3IWF network element. If the terminal device exceeds the service area of the source N3IWF network element, perform step S503; or if the terminal device does not exceed the service area of the source N3IWF network element, go back to step S501 and perform step S501.

S503. The source N3IWF network element determines to perform N3IWF network element handover on the terminal device.

S504. The source N3IWF network element determines a target N3IWF network element based on the location information of the terminal device and configuration information of the N3IWF network element.

Optionally, step S504 may be replaced with the following steps:

S504a. The source N3IWF network element sends a request message to a domain name server. The request message is used to request a target N3IWF network element.

Optionally, the request message may include the location information of the terminal device.

S504b. The domain name server sends identification information of the target N3IWF network element to the source N3IWF network element.

S504c. The source N3IWF network element determines the target N3IWF network element based on the identification information of the target N3IWF network element.

Alternatively, step S504 may be replaced with the following steps:

S504d. The source N3IWF network element sends a request message to an NRF network element. The request message is used to request a target N3IWF network element.

Optionally, the request message may include the location information of the terminal device.

S504e. The NRF network element sends identification information of the target N3IWF network element to the source N3IWF network element.

S504f. The source N3IWF network element determines the target N3IWF network element based on the identification information of the target N3IWF network element.

S505. The source N3IWF network element hands over the terminal device from the source N3IWF network element to the target N3IWF network element.

After step S505 is completed, the procedure ends.

Example 3: After user plane reconfiguration of a terminal device is completed, an SMF network element sends, to a source N3IWF network element, information about a UPF network element currently corresponding to the terminal device. The source N3IWF network element performs N3IWF network element handover on the terminal device based on the location information of the terminal device in a connected mode and the information about the UPF network element currently corresponding to the terminal device.

Figure 9:
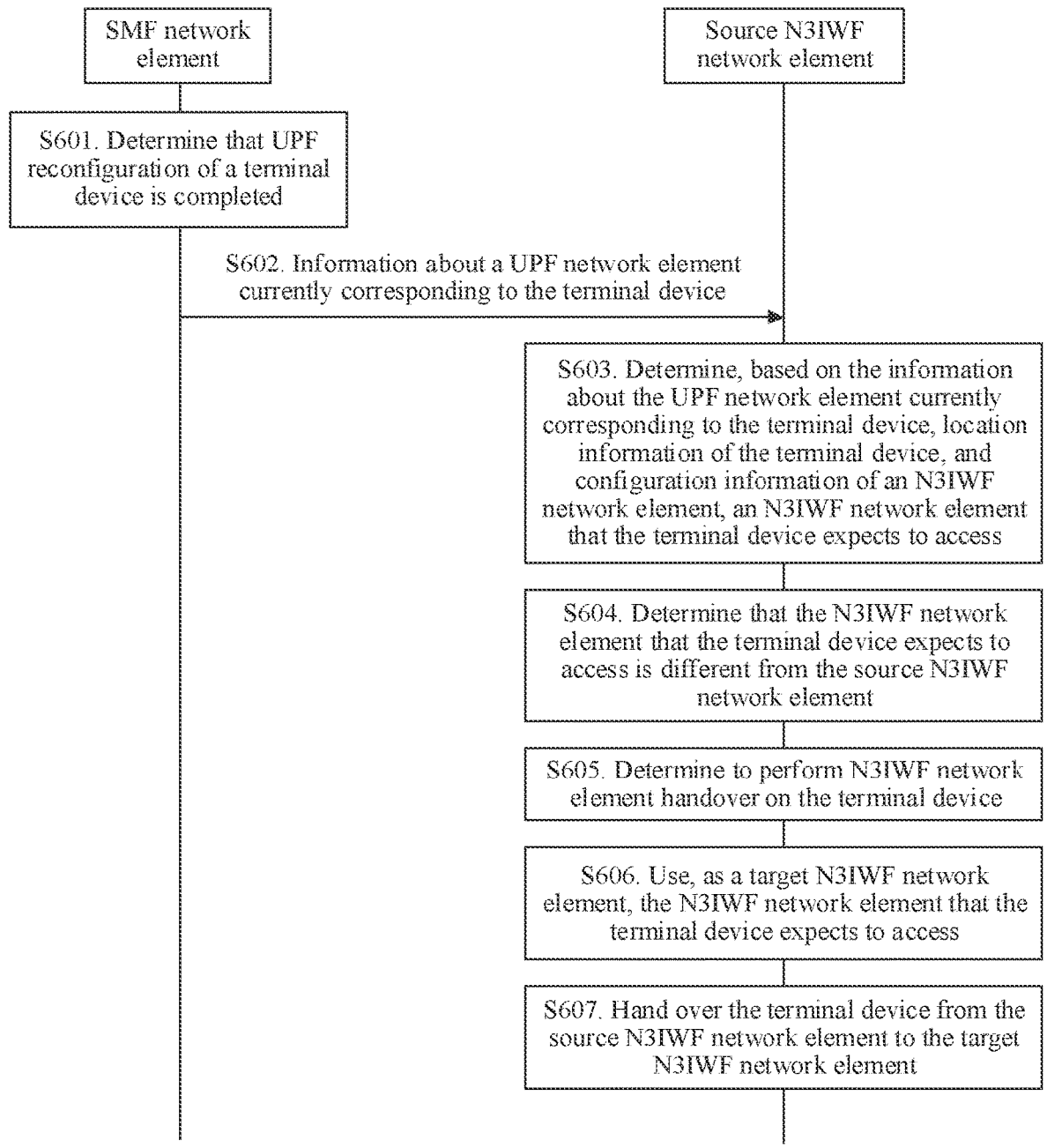
FIG. 9 is a flowchart of still another N3IWF network element handover method according to an embodiment of this application.

FIG. 9 is a flowchart of still another N3IWF network element handover method according to an embodiment of this application. As shown in FIG. 9, the method includes the following steps:

S601. An SMF network element determines that UPF reconfiguration of a terminal device is completed.

S602. The SMF network element sends, to a source N3IWF network element, information about a UPF network element currently corresponding to the terminal device.

The information about the UPF network element includes an identifier of the UPF network element and/or location information of the UPF network element.

Optionally, the SMF network element may further send user plane change indication information and/or location information of the terminal device to the source N3IWF network element.

S603. The source N3IWF network element determines, based on the information about the UPF network element currently corresponding to the terminal device, the location information of the terminal device, and configuration information of the N3IWF network element, an N3IWF network element that the terminal device expects to access.

Optionally, step S603 may be replaced with the following steps:

S603a. The source N3IWF network element sends a request message to a domain name server. The request message is used to request an N3IWF network element that the terminal device expects to access. The request message may include the information about the UPF network element currently corresponding to the terminal device and the location information of the terminal device.

S603b. The domain name server sends, to the source N3IWF network element, identification information of the N3IWF network element that the terminal device expects to access.

S603c. The source N3IWF network element determines, based on the identification information of the N3IWF network element that the terminal device expects to access, the N3IWF network element that the terminal device expects to access.

Alternatively, step S603 may be replaced with the following steps:

S603d. The source N3IWF network element sends a request message to an NRF network element. The request message is used to request an N3IWF network element that the terminal device expects to access. The request message may include the information about the UPF network element currently corresponding to the terminal device and the location information of the terminal device.

S603e. The NRF network element sends, to the source N3IWF network element, identification information of the N3IWF network element that the terminal device expects to access.

S603f. The source N3IWF network element determines, based on the identification information of the N3IWF network element that the terminal device expects to access, the N3IWF network element that the terminal device expects to access.

Optionally, before step S603 is performed, the method may further include the following steps:

S603g. The source N3IWF network element sends, to the terminal device, a request message used to request the location information.

S603h. The terminal device sends a response message for the request message to the source N3IWF network element. The response message may carry the location information of the terminal device.

Alternatively, before step S603 is performed, the method may include the following steps:

S603i. The source N3IWF network element sends, to the AMF network element, a request message used to request the location information of the terminal device.

S603j. The AMF network element sends a response message for the request message to the source N3IWF network element. The response message may carry the location information of the terminal device.

S604. The source N3IWF network element determines that the N3IWF network element that the terminal device expects to access is different from the source N3IWF network element.

S605. The source N3IWF network element determines to perform N3IWF network element handover on the terminal device.

S606. The source N3IWF network element uses, as a target N3IWF network element, the N3IWF network element that the terminal device expects to access.

S607. The source N3IWF network element hands over the terminal device from the source N3IWF network element to the target N3IWF network element.

After step S607 is completed, the procedure ends.

Example 4: When a terminal device is in an idle state, an access network device accessed by the terminal device changes, and a gateway: an N3IWF network element that the terminal device expects to access is different from a source N3IWF network element, the terminal device performs N3IWF network element handover on the terminal device.

Figure 10:
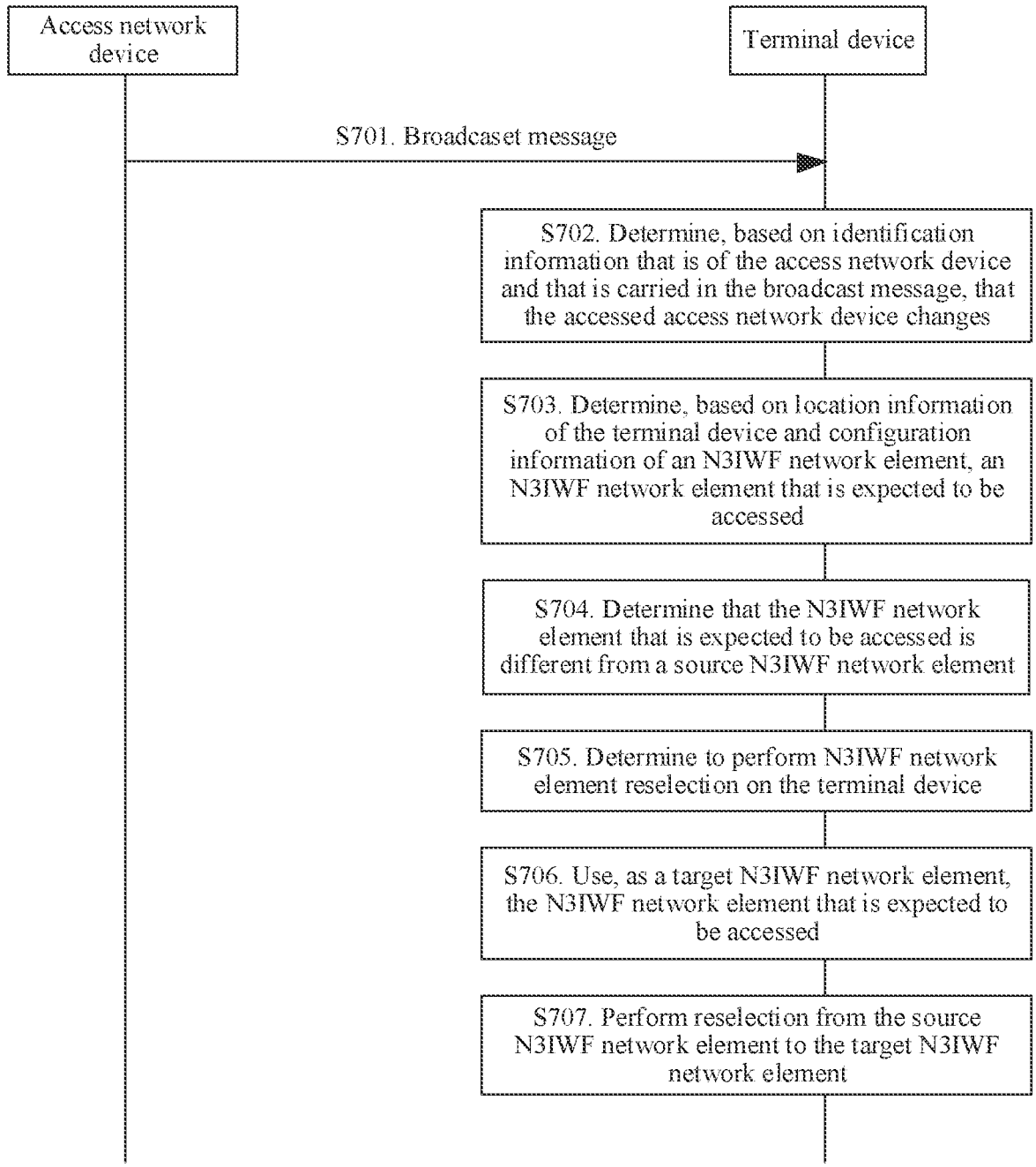
FIG. 10 is a flowchart of an N3IWF network element reselection method according to an embodiment of this application.

FIG. 10 is a flowchart of an N3IWF network element reselection method according to an embodiment of this application. As shown in FIG. 10, the method includes the following steps:

S701. An access network device sends a broadcast message to a terminal device.

The broadcast message includes identification information of the access network device.

S702. The terminal device determines, based on the identification information that is of the access network device and that is carried in the broadcast message, that the accessed access network device changes.

S703. The terminal device determines, based on location information of the terminal device and configuration information of an N3IWF network element, an N3IWF network element that is expected to be accessed.

Optionally, step S703 may be replaced with the following steps:

S703a. The terminal device sends a request message to a domain name server. The request message is used to request an N3IWF network element that the terminal device expects to access.

Optionally, the request message may include the location information of the terminal device.

S703b. The domain name server sends, to the terminal device, identification information of the N3IWF network element that the terminal device expects to access.

S703c. The terminal device determines, based on the identification information of the N3IWF network element that the terminal device expects to access, the N3IWF network element that the terminal device expects to access.

S704. The terminal device determines that the N3IWF network element that is expected to be accessed is different from the source N3IWF network element.

S705. The terminal device determines to perform N3IWF network element reselection on the terminal device.

S706. The terminal device uses, as a target N3IWF network element, the N3IWF network element that is expected to be accessed.

S707. The terminal device performs reselection from the source N3IWF network element to the target N3IWF network element.

After step S707 is completed, the procedure ends.

Example 5: After user plane reconfiguration of a terminal device in a connected mode is completed, an SMF network element sends, to the terminal device, information about a UPF network element currently corresponding to the terminal device. The terminal device performs N3IWF network element reselection on the terminal device based on the location information of the terminal device and the information about the UPF network element currently corresponding to the terminal device.

Figure 11:
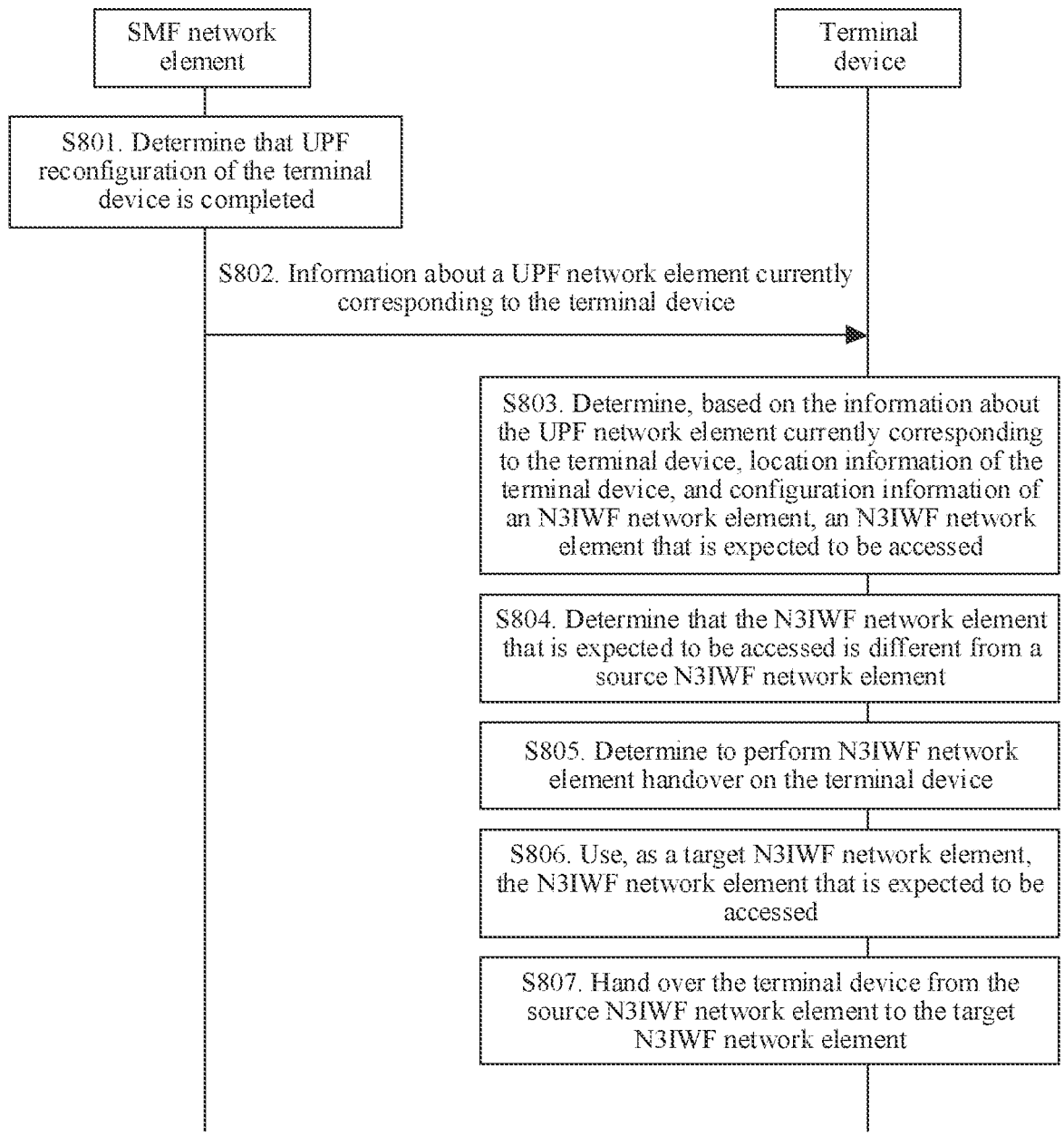
FIG. 11 is a flowchart of another N3IWF network element reselection method according to an embodiment of this application.

FIG. 11 is a flowchart of another N3IWF network element reselection method according to an embodiment of this application. As shown in FIG. 11, the method includes the following steps:

S801. An SMF network element determines that UPF reconfiguration of a terminal device is completed.

S802. The SMF network element sends, to the terminal device, information about a UPF network element currently corresponding to the terminal device.

The information about the UPF network element includes an identifier of the UPF network element and/or location information of the UPF network element.

Optionally, the SMF network element may further send user plane change indication information to the terminal device.

S803. The terminal device determines, based on the information about the UPF network element currently corresponding to the terminal device, the location information of the terminal device, and configuration information of an N3IWF network element, an N3IWF network element that is expected to be accessed.

Optionally, step S803 may be replaced with the following steps:

S803a. The terminal device network element sends a request message to a domain name server. The request message is used to request an N3IWF network element that the terminal device expects to access. The request message may include the information about the UPF network element currently corresponding to the terminal device and the location information of the terminal device.

S803b. The domain name server sends, to the terminal device network element, identification information of the N3IWF network element that the terminal device expects to access.

S803c. The terminal device network element determines, based on the identification information of the N3IWF network element that the terminal device expects to access, the N3IWF network element that the terminal device expects to access.

S804. The terminal device determines that the N3IWF network element that is expected to be accessed is different from a source N3IWF network element.

S805. The terminal device determines to perform N3IWF network element reselection on the terminal device.

S806. The terminal device uses, as a target N3IWF network element, the N3IWF network element that is expected to be accessed.

S807. The terminal device performs reselection from the source N3IWF network element to the target N3IWF network element.

After step S807 is completed, the procedure ends.

According to a network switching method provided in this embodiment of this application, in a non-3GPP network architecture, when N3IWF network element handover needs to be performed on the terminal device, the source N3IWF network element or the terminal device may hand over the terminal device from the source N3IWF network element to the target N3IWF network element, to implement N3IWF network element handover in the non-3GPP network architecture, thereby expanding a use scenario of the non-3GPP network architecture.

Figure 12:
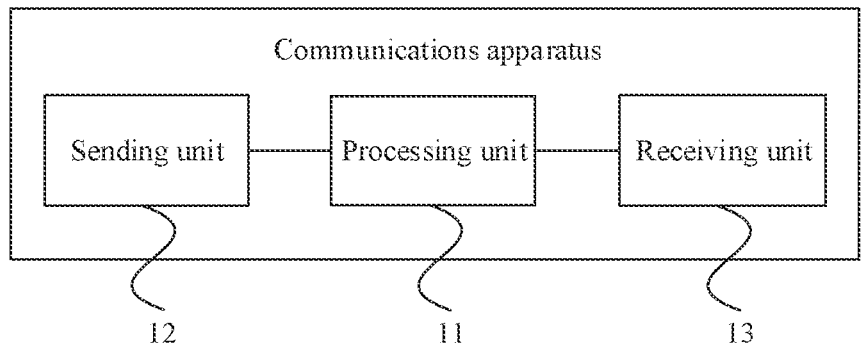
FIG. 12 is a schematic structural diagram of a communications apparatus according to an embodiment of this application.

FIG. 12 is a schematic structural diagram of a communications apparatus according to an embodiment of this application. The communications apparatus in this embodiment may be the foregoing described gateway, or may be a chip used in the gateway. The communications apparatus may be configured to perform actions of the source gateway in the foregoing method embodiments. As shown in FIG. 12, the communications apparatus may include a processing unit 11. Optionally, the communications apparatus further includes a sending unit 12 and a receiving unit 13.

The processing unit 11 determines to perform gateway handover on a terminal device, determines a target gateway that is to be used to serve the terminal device, and hands over the terminal device from a source gateway to the target gateway.

In a possible implementation, the processing unit 11 is specifically configured to: receive indication information from a core network element by using the receiving unit 13, and determine, based on the indication information, to perform gateway handover on the terminal device. The indication information is used to indicate to perform gateway handover on the terminal device.

In another possible implementation, the processing unit 11 is further configured to obtain location information of the terminal device. For example, the processing unit 11 is specifically configured to: receive the location information from the terminal device by using the receiving unit 13, or receive the location information from a core network element by using the receiving unit 13.

In the foregoing two implementations, the processing unit 11 is specifically configured to determine, based on the location information of the terminal device and configuration information of the source gateway, to perform gateway handover on the terminal device. For example, the configuration information of the source gateway includes a service area of the source gateway. In this case, the processing unit 11 is specifically configured to: determine, based on the location information of the terminal device and the service area of the source gateway, that the terminal device exceeds the service area of the source gateway; and determine to perform gateway handover on the terminal device.

Correspondingly, in the foregoing two implementations, the processing unit 11 is specifically configured to determine the target gateway based on the location information of the terminal device and gateway configuration information. The gateway configuration information includes identification information of a candidate gateway and location information of the candidate gateway.

Alternatively, the processing unit 11 is specifically configured to: send a request message to a domain name server by using the sending unit 12, receive identification information of the target gateway from the domain name server by using the receiving unit 13, and determine the target gateway based on the identification information of the target gateway. The request message is used to request the target gateway. For example, the request message includes the location information of the terminal device.

Alternatively, the processing unit 11 is specifically configured to: send a request message to a network function repository function network element by using the sending unit 12, receive identification information of the target gateway from the network function repository function network element by using the receiving unit 13, and determine the target gateway based on the identification information of the target gateway. The request message is used to request the target gateway. For example, the request message includes the location information of the terminal device.

In still another possible implementation, the processing unit 11 is specifically configured to: determine, based on the location information of the terminal device and information about a user plane network element, a gateway that the terminal device expects to access; determine that the gateway that the terminal device expects to access is different from the source gateway; and determine to perform gateway handover on the terminal device. The information about the user plane network element may include an identifier of the user plane network element and/or location information of the user plane network element.

Optionally, the processing unit 11 is further configured to obtain the information about the user plane network element. For example, the processing unit 11 is specifically configured to receive the information about the user plane network element from a core network element by using the receiving unit 13. In some embodiments, the processing unit 11 is further configured to receive user plane change indication information from the core network element by using the receiving unit 13.

In this implementation, the processing unit 11 is specifically configured to determine, based on the location information of the terminal device, the information about the user plane network element, and gateway configuration information, the gateway that the terminal device expects to access. The gateway configuration information includes identification information of a candidate gateway and location information of the candidate gateway. For example, the processing unit 11 is specifically configured to: determine, based on the location information of the terminal device and the information about the user plane network element, a candidate gateway from the gateway configuration information as the gateway that the terminal device expects to access; and when the gateway that the terminal device expects to access is different from the source gateway, use, as the target gateway, the gateway that the terminal device expects to access.

Alternatively, the processing unit 11 is specifically configured to: send a request message to a domain name server by using the sending unit 12; receive, from the domain name server by using the receiving unit 13, identification information of the gateway that the terminal device expects to access; and determine, based on the identification information of the gateway that the terminal device expects to access, the gateway that the terminal device expects to access. The request message is used to request the gateway that the terminal device expects to access. The request message includes the location information of the terminal device and user plane information.

Alternatively, the processing unit 11 is further configured to: send a request message to a network function repository function network element by using the sending unit 12; receive, from the network function repository function network element by using the receiving unit 13, identification information of the gateway that the terminal device expects to access; and determine, based on the identification information of the gateway that the terminal device expects to access, the gateway that the terminal device expects to access. The request message is used to request the gateway that the terminal device expects to access. The request message includes the location information of the terminal device and user plane information.

The communications apparatus provided in this embodiment of this application may perform actions of the source gateway in the foregoing method embodiments. An implementation principle and a technical effect thereof are similar to those in the method embodiments. Details are not described herein again.

Figure 13:
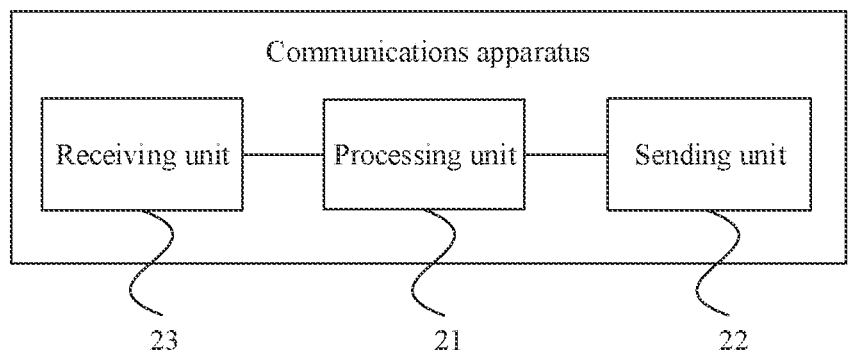
FIG. 13 is a schematic structural diagram of another communications apparatus according to an embodiment of this application.

FIG. 13 is a schematic structural diagram of another communications apparatus according to an embodiment of this application. The communications apparatus in this embodiment may be the foregoing described terminal device, or may be a chip used in the terminal device. The communications apparatus may be configured to perform actions of the terminal device in the foregoing method embodiments. As shown in FIG. 13, the communications apparatus may include a processing unit 21. Optionally, the communications apparatus further includes a sending unit 22 and a receiving unit 23.

The processing unit 21 is configured to: determine to perform gateway reselection on a terminal device, determine a target gateway that is to be used to serve the terminal device, and reselect the target gateway from a source gateway. For example, the processing unit 21 is specifically configured to send a registration update request to the target gateway by using the sending unit 22. The registration update request includes a mobility registration update type.

In a possible implementation, the processing unit 21 is specifically configured to determine, based on a change of an access network device accessed by the terminal device, to perform gateway reselection on the terminal device. For example, the processing unit 21 is specifically configured to: when the access network device accessed by the terminal device changes, determine a gateway that the terminal device expects to access; determine that the gateway that the terminal device expects to access is different from the source gateway; and determine to perform gateway reselection on the terminal device. For example, the processing unit 21 is specifically configured to: when the gateway that the terminal device expects to access is different from the source gateway, use, as the target gateway, the gateway that the terminal device expects to access.

For example, the processing unit 21 is specifically configured to determine, based on location information of the terminal device and gateway configuration information, the gateway that the terminal device expects to access. The gateway configuration information includes identification information of a candidate gateway and location information of the candidate gateway.

Alternatively, the processing unit 21 is specifically configured to: send a request message to a domain name server by using the sending unit 22; receive, from the domain name server by using the receiving unit 23, identification information of the gateway that the terminal device expects to access; and determine, based on the identification information of the gateway that the terminal device expects to access, the gateway that the terminal device expects to access. The request message is used to request the gateway that the terminal device expects to access. For example, the request message includes the location information of the terminal device.

Optionally, in this implementation, the processing unit 21 is further configured to obtain identification information of the access network device accessed by the terminal device. For example, the processing unit 21 is specifically configured to receive a broadcast message from the access network device by using the receiving unit 23. The broadcast message includes the identification information of the access network device.

In another possible implementation, the processing unit 21 is specifically configured to: determine, based on the location information of the terminal device and information about a user plane network element, a gateway that the terminal device expects to access; determine that the gateway that the terminal device expects to access is different from the source gateway; and determine to perform gateway reselection on the terminal device. The information about the user plane network element includes an identifier of the user plane network element and/or location information of the user plane network element.

Optionally, the processing unit 21 is further configured to obtain the information about the user plane network element. For example, the processing unit 21 is specifically configured to receive user plane information from a core network element by using the receiving unit 23. In some embodiments, the processing unit 21 is further configured to receive user plane change indication information from the core network element by using the receiving unit 23.

In this implementation, the processing unit 21 is specifically configured to determine, based on the location information of the terminal device, the information about the user plane network element, and gateway configuration information, the gateway that the terminal device expects to access. For example, the gateway configuration information includes identification information of a candidate gateway and location information of the candidate gateway. For example, the processing unit 21 is specifically configured to: determine, based on the location information of the terminal device and the information about the user plane network element, a candidate gateway from the gateway configuration information as the gateway that the terminal device expects to access; and when the gateway that the terminal device expects to access is different from the source gateway, use, as the target gateway, the gateway that the terminal device expects to access.

Alternatively, the processing unit 21 is specifically configured to: send a request message to a domain name server by using the sending unit 22; receive, from the domain name server by using the receiving unit 23, identification information of the gateway that the terminal device expects to access; and determine, based on the identification information of the gateway that the terminal device expects to access, the gateway that the terminal device expects to access. The request message is used to request the gateway that the terminal device expects to access. The request message is used to request the gateway that the terminal device expects to access. The request message includes the location information of the terminal device and user plane information.

The communications apparatus provided in this embodiment of this application may perform actions of the terminal device in the foregoing method embodiments. An implementation principle and a technical effect thereof are similar to those in the method embodiments. Details are not described herein again.

Figure 14:
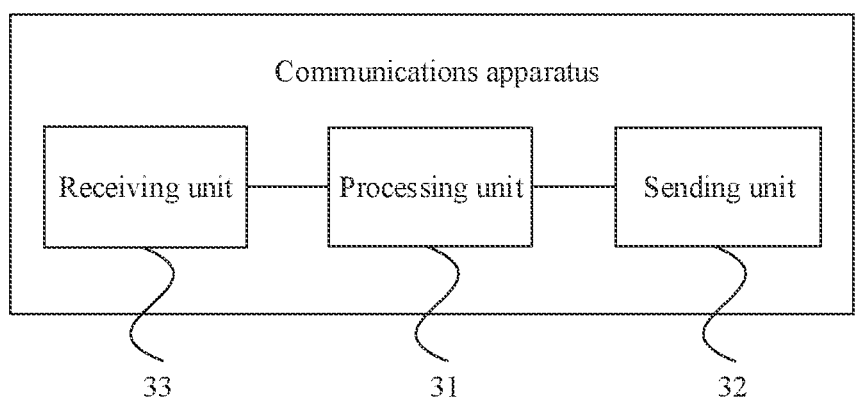
FIG. 14 is a schematic structural diagram of still another communications apparatus according to an embodiment of this application.

FIG. 14 is a schematic structural diagram of still another communications apparatus according to an embodiment of this application. The communications apparatus in this embodiment may be the foregoing described network element that sends indication information to a source gateway to indicate the source gateway to perform gateway handover on a terminal device, or may be a chip used in the network element. The network element may be, for example, a core network element (for example, an AMF network element or an SMF network element), or may be a third-party network element. As shown in FIG. 14, the communications apparatus may include a processing unit 31 and a sending unit 32. Optionally, the communications apparatus may further include a receiving unit 33.

The processing unit 31 is configured to determine to perform gateway handover on a terminal device. The sending unit 32 is configured to send indication information to a source gateway. The indication information is used to indicate to perform gateway handover on the terminal device.

Optionally, the processing unit 31 is further configured to obtain location information of the terminal device. For example, the processing unit 31 is specifically configured to receive the location information from the terminal device by using the receiving unit 33.

In this implementation, the processing unit 31 is specifically configured to determine, based on the location information of the terminal device and configuration information of the source gateway, to perform gateway handover on the terminal device. For example, the configuration information of the source gateway includes a service area of the source gateway. In this case, the processing unit 31 is specifically configured to: determine, based on the location information of the terminal device and the service area of the source gateway, that the terminal device exceeds the service area of the source gateway; and determine to perform gateway handover on the terminal device.

The communications apparatus provided in this embodiment of this application may perform the action performed by the network element for sending the indication information to the source gateway to indicate the source gateway to perform gateway handover on the terminal device in the foregoing method embodiments. An implementation principle and a technical effect thereof are similar to those in the method embodiments. Details are not described herein again.

Figure 15:
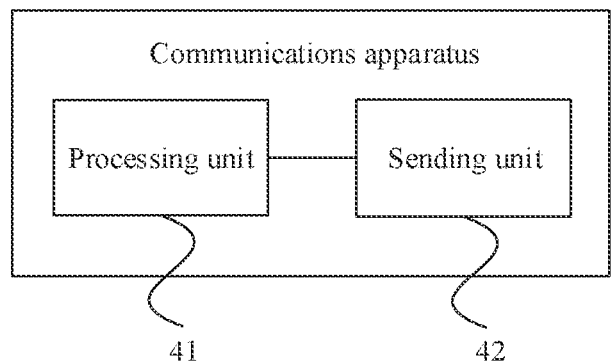
FIG. 15 is a schematic structural diagram of still another communications apparatus according to an embodiment of this application.

FIG. 15 is a schematic structural diagram of still another communications apparatus according to an embodiment of this application. The communications apparatus in this embodiment may be the foregoing described network element that sends information about a user plane network element to a source gateway or a terminal device, or may be a chip used in the network element. The network element may be, for example, a core network element (for example, an AMF network element or an SMF network element). As shown in FIG. 14, the communications apparatus may include a processing unit 41 and a sending unit 42.

The processing unit 41 is configured to determine that user plane reconfiguration of a terminal device is completed. The sending unit 42 is configured to send information about a user plane network element to a gateway or the terminal device.

Optionally, the sending unit 42 is further configured to send user plane change indication information to the gateway or the terminal device.

Optionally, the information about the user plane network element includes at least one of the following: an identifier of the user plane network element and/or location information of the user plane network element.

The communications apparatus provided in this embodiment of this application may perform the action performed by the network element for sending the information about the user plane network element to the source gateway or the terminal device in the foregoing method embodiments. An implementation principle and a technical effect thereof are similar to those in the method embodiments. Details are not described herein again.

It should be noted that, it should be understood that the foregoing receiving unit may be a receiver or a communications interface in actual implementation, and the sending unit may be a transmitter or a communications interface in actual implementation. The processing unit may be implemented in a form of software invoking by using a processing element, or may be implemented in a form of hardware. For example, the processing unit may be an independently disposed processing element, or may be integrated into a chip of the foregoing apparatus for implementation. In addition, the processing unit may be alternatively stored in a memory of the foregoing apparatus in a form of program code, and invoked by a processing element of the foregoing apparatus to perform the foregoing functions of the processing unit. In addition, all or some of the units may be integrated together, or may be implemented independently. The processing element may be an integrated circuit and has a signal processing capability. In an implementation process, steps in the foregoing methods or the foregoing units can be implemented by using a hardware integrated logical circuit in the processing element, or by using instructions in a form of software.

For example, the foregoing units may be one or more integrated circuits configured to implement the foregoing method, for example, one or more application-specific integrated circuits (ASIC), one or more microprocessors (digital signal processor, DSP), or one or more field programmable gate arrays (FPGA). For another example, when one of the foregoing units is implemented in a form of invoking program code by a processing element, the processing element may be a general purpose processor, for example, a central processing unit (CPU), or another processor that can invoke the program code. For another example, these units may be integrated together, and are implemented in a form of a system-on-a-chip (SOC).

Figure 16:
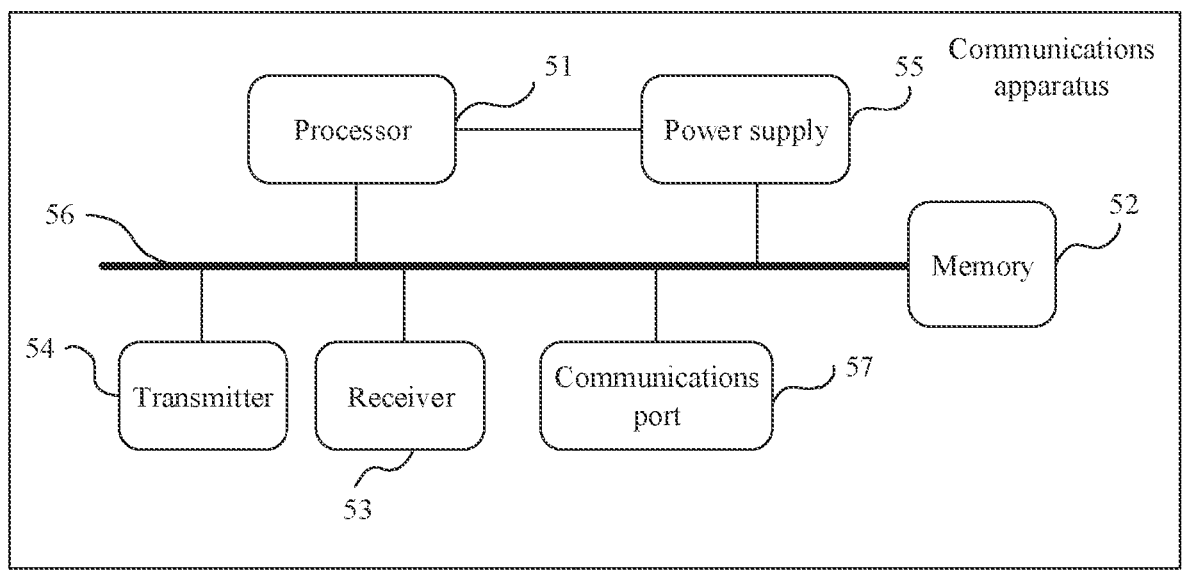
FIG. 16 is a schematic structural diagram of still another communications apparatus according to an embodiment of this application.

FIG. 16 is a schematic structural diagram of still another communications apparatus according to an embodiment of this application. As shown in FIG. 16, the communications apparatus may include a processor 51 (for example, a CPU), a memory 52, a receiver 53, and a transmitter 54. Both the receiver 53 and the transmitter 54 are coupled to the processor 51. The processor 51 controls a receiving action of the receiver 53, and the processor 51 controls a sending action of the transmitter 54. The memory 52 may include a high-speed random access memory (RAM), and may further include a non-volatile memory (NVM), for example, at least one disk memory. The memory 52 may store various instructions to complete various processing functions and implement the method steps of this application. Optionally, the communications apparatus in this application may further include a power supply 55, a communications bus 56, and a communications port 57. The receiver 53 and the transmitter 54 may be integrated into a transceiver of the communications apparatus, or may be a transceiver antenna independent of the communications apparatus. The communications bus 56 is configured to implement a communication connection between components. The communications port 57 is configured to implement connection and communication between the communications apparatus and another peripheral.

In this embodiment of this application, the memory 52 is configured to store computer executable program code. The program code includes an instruction. When the processor 51 executes the instruction, the instruction enables the processor 51 of the communications apparatus to perform processing actions of the terminal device in the foregoing method embodiments, enables the receiver 53 to perform receiving actions of the terminal device in the foregoing method embodiments, and enables the transmitter 54 to perform sending actions of the terminal device in the foregoing method embodiments. An implementation principle and a technical effect thereof are similar to those in the method embodiments. Details are not described herein again.

Figure 17:
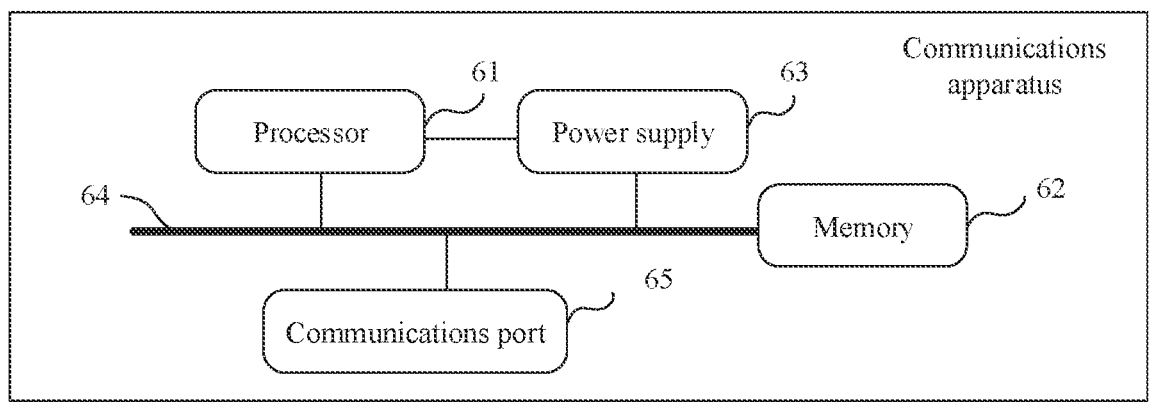
FIG. 17 is a schematic structural diagram of still another communications apparatus according to an embodiment of this application.

FIG. 17 is a schematic structural diagram of still another communications apparatus according to an embodiment of this application. As shown in FIG. 17, the communications apparatus may include a processor 61 (for example, a CPU) and a memory 62. The memory 62 may include a high-speed random access memory (RAM), and may further include a non-volatile memory (NVM), for example, at least one disk memory. The memory 62 may store various instructions to complete various processing functions and implement the method steps of this application. Optionally, the communications apparatus in this application may further include a power supply 63, a communications bus 64, and a communications port 65. The communications bus 64 is configured to implement a communication connection between components. The communications port 65 is configured to implement connection and communication between the communications apparatus and another peripheral.

In this embodiment of this application, the memory 62 is configured to store computer executable program code. The program code includes an instruction. When the processor 61 executes the instruction, the instruction enables the processor 61 of the communications apparatus to execute actions of the source gateway in the foregoing method embodiments. An implementation principle and a technical effect thereof are similar to those in the method embodiments. Details are not described herein again.

Alternatively, when the processor 61 executes the instruction, the instruction enables the processor 61 of the communications apparatus to perform the action of sending indication information to the source gateway to indicate the source gateway to perform gateway handover on the terminal device in the foregoing method embodiments. An implementation principle and a technical effect thereof are similar to those in the method embodiments. Details are not described herein again. Herein, the communications apparatus may be, for example, an AMF network element, an SMF network element, or a third-party network element.

Alternatively, when the processor 61 executes the instruction, the instruction enables the processor 61 of the communications apparatus to perform the action of sending information about a user plane network element to the source gateway or the terminal device in the foregoing method embodiments. An implementation principle and a technical effect thereof are similar to those in the method embodiments. Details are not described herein again. Herein, the communications apparatus may be, for example, an SMF network element.

The processing unit (or the processor), the storage unit (or the memory), and the sending/receiving unit (the transceiver) in the apparatus in each of FIG. 11 to FIG. 17 of this application communicate with each other and transmit a control signal and/or a data signal by using an internal connection path. The foregoing method embodiments of this application may be used in a processor, or the steps in the foregoing method embodiments are implemented by a processor. The processor may be an integrated circuit chip and has a signal processing capability. In an implementation process, the steps in the foregoing method embodiments may be implemented by using a hardware integrated logical circuit in the processor, or by using instructions in a form of software. The processor may be a central processing unit (CPU), a network processor (NP), a combination of a CPU and an NP, a digital signal processor (DSP), an application-specific integrated circuit (ASIC), a field programmable gate array (FPGA) or another programmable logic device, a discrete gate, a transistor logic device, or a discrete hardware component. The methods, the steps, and logical block diagrams that are disclosed in this application may be implemented or executed. The general purpose processor may be a microprocessor, or the processor may be any conventional processor or the like. The steps of the methods disclosed in this application may be directly executed and completed by a hardware decoding processor, or may be executed and completed by using a combination of hardware and software modules in the decoding processor. A software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. Although only one processor is shown in the figure, the apparatus may include a plurality of processors, or the processor includes a plurality of processing units. Specifically, the processor may be a single-core (single-CPU) processor, or may be a multi-core (multi-CPU) processor.

The memory is configured to store a computer instruction executed by the processor. The memory may be a storage circuit, or may be a memory. The memory may be a volatile memory or a nonvolatile memory, or may include a volatile memory and a nonvolatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), and serve as an external cache. The memory may be independent of the processor, or may be a storage unit in the processor. This is not limited herein. Although only one memory is shown in the figure, the apparatus may include a plurality of memories, or the memory includes a plurality of storage units.

The transceiver is configured to implement content interaction between the processor and another unit or network element. Specifically, the transceiver may be a communications interface of the apparatus, or may be a transceiver circuit or a communications unit, or may be a transceiver. The transceiver may be alternatively a communications interface or a transceiver circuit of the processor. Optionally, the transceiver may be a transceiver chip. The transceiver may further include a sending unit and/or a receiving unit. In a possible implementation, the transceiver may include at least one communications interface. In another possible implementation, the transceiver may be alternatively a unit implemented in a software form. In each embodiment of this application, the processor may interact with another unit or network element by using the transceiver. For example, the processor obtains or receives content from another network element by using the transceiver. If the processor and the transceiver are two physically separated components, the processor may exchange content with another unit of the apparatus without using the transceiver.

In a possible implementation, the processor, the memory, and the transceiver may be connected to each other by using the bus. The bus may be a peripheral component interconnect (PCI) bus, an extended industry standard architecture (EISA) bus, or the like. The bus may be classified into an address bus, a data bus, a control bus, and the like.

In addition, in the embodiments of this application, words such as "example" or "for example" are used to represent giving an example, an illustration, or a description. Any embodiment or design scheme described as "example" or "for example" in the embodiments of this application should not be explained as being more preferred or having more advantages than another embodiment or design scheme. Exactly, use of the word "example", "for example", or the like is intended to present a relative concept in a specific manner.

In the embodiments of this application, for ease of understanding, a plurality of examples are used for description. However, these examples are merely examples. It does not mean that these examples are best implementations for implementing this application.

In the embodiments of this application, for ease of description, names of a request message, a response message, and various other messages are used. However, these messages are merely used as an example to describe content that needs to be carried or an implemented function. A specific name of a message constitutes no limitation to this application. For example, the messages may be a first message, a second message, and a third message. These messages may be specific messages, or may be some fields in the messages. These messages may also represent various service operations.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid State Disk (SSD)), or the like.

The term "a plurality of" in this application indicates two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects, and the character "/" in a formula represents a "division" relationship between the associated objects.

It may be understood that various numerals in the embodiments of this application are merely used for distinguishing for ease of description, and are not intended to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A method comprising:
determining, by a terminal device served by a first source gateway and in response to a first triggering event, whether to perform a first gateway reselection to reselect a gateway for serving the terminal device, wherein determining whether to perform the first gateway reselection comprises:
determining, by the terminal device from first candidate gateways in a serving domain in which the first source gateway is located, a first gateway that the terminal device is to access, wherein the first gateway that the terminal device is to access is determined based on first location information of the terminal device and respective location information of the first candidate gateways, the first gateway being a gateway of the first candidate gateways that is determined to be closest to the terminal device based on the first location information of the terminal device and the respective location information of the first candidate gateways; and
determining, by the terminal device, based on identification information of the first gateway that the terminal device is to access, that the first gateway that the terminal device is to access is different than the first source gateway;

determining, by the terminal device in response to the first gateway being different than the first source gateway, to perform the first gateway reselection;

determining, by the terminal device in response to determining to perform the first gateway reselection, a first target gateway that is to be used to serve the terminal device, the first target gateway being the first gateway that the terminal device is to access;

performing, by the terminal device, the first gateway reselection by changing from being served by the first source gateway to being served by the first target gateway;

determining, by the terminal device served by a second source gateway and in response to a second triggering event, whether to perform a second gateway reselection to reselect a gateway for serving the terminal device, the second triggering event comprising detecting, by the terminal device, a user plane reconfiguration;

determining, by the terminal device in response to determining to perform the second gateway reselection and according to second location information of the terminal device, information about a user plane network element serving the terminal device, and gateway configuration information of second candidate gateways in a second serving domain in which the second source gateway is located, a second gateway that the terminal device is to access;

determining, by the terminal device, based on identification information of the second gateway that the terminal device is to access, that the second gateway that the terminal device is to access is different than the second source gateway; and performing, by the terminal device in response to determining that the second gateway that the terminal device is to access is different than the second source gateway, the second gateway reselection by changing from being served by the second source gateway to being served by a second target gateway, the second target gateway being the second gateway that the terminal device is to access.

2. The method according to claim 1, wherein the first triggering event comprises:
determining, by the terminal device, that an access network device accessed by the terminal device has changed.

3. The method according to claim 1, wherein determining, by the terminal device, the first gateway that the terminal device is to access comprises:
determining, by the terminal device based on the location information of the terminal device and gateway configuration information of the first candidate gateways, the gateway of the first candidate gateways that is closest to the terminal device, the gateway configuration information comprising the respective location information of the first candidate gateways; and
selecting the gateway of the first candidate gateways that is closest to the terminal device as the first gateway that the terminal device is to access.

4. The method according to claim 3, wherein the gateway configuration information further comprises respective identification information of the first candidate gateways.

5. The method according to claim 1, wherein determining, by the terminal device, the first gateway that the terminal device is to access comprises:
sending, by the terminal device, a request message to a domain name server, wherein the request message requests information of the first gateway that the terminal device is to access; and
receiving, by the terminal device from the domain name server, identification information of the first gateway that the terminal device is to access.

6. The method according to claim 5, wherein the request message comprises the first location information of the terminal device.

7. The method according to claim 1, wherein the information about the user plane network element comprises:
an identifier of the user plane network element or location information of the user plane network element.

8. The method according to claim 1, wherein:
the gateway configuration information of the second candidate gateways comprises respective identification information of the second candidate gateways, and respective location information of the second candidate gateways; and
determining the second gateway that the terminal device is to access comprises:
determining, by the terminal device based on the second location information of the terminal device and the information about the user plane network element, the second gateway from the second candidate gateways; and
determining, by the terminal device, the second target gateway comprises:
when the second gateway that the terminal device is to access is different than the second source gateway, using, by the terminal device, the second gateway that the terminal device is to access as the second target gateway.

9. The method according to claim 1, wherein determining the first second gateway that the terminal device is to access comprises:
sending, by the terminal device, a request message to a domain name server, wherein the request message requests information of the second gateway that the terminal device is to access, and the request message comprises the second location information of the terminal device and the user plane information; and
receiving, by the terminal device from the domain name server, identification information of the first second gateway that the terminal device is to access.

10. The method according to claim 1, wherein performing, by the terminal device, the first gateway reselection comprises:
sending, by the terminal device, a registration update request to the first target gateway, wherein the registration update request comprises a mobility registration update type.

11. The method according to claim 1, wherein the second source gateway is the first target gateway.

12. The method according to claim 1, wherein performing, by the terminal device, the second gateway reselection comprises:
sending, by the terminal device, a registration update request to the second target gateway, wherein the registration update request comprises a mobility registration update type.

13. A communications apparatus comprising:
a non-transitory memory storage comprising instructions; and
one or more processors in communication with the memory storage, wherein the instructions, when executed by the one or more processors, cause the communications apparatus to perform:

determining, in response to a first triggering event, whether to perform a first gateway reselection to reselect a gateway for serving the communications apparatus, the communications apparatus served by a first source gateway, wherein determining whether to perform the first gateway reselection comprises:

determining, by the communications apparatus from first candidate gateways in a serving domain in which the first source gateway is located, a first gateway that the communications apparatus is to access, wherein the first gateway that the communications apparatus is to access is determined based on first location information of the communications apparatus and respective location information of the first candidate gateways, the first gateway being a gateway of the first candidate gateways that is determined to be closest to the communications apparatus based on the first location information of the communications apparatus and the respective location information of the first candidate gateways; and determining, by the communications apparatus, based on identification information of the first gateway that the communications apparatus is to access, that the first gateway that the communications apparatus is to access is different than the first source gateway;

determining, by the communications apparatus in response to the first gateway being different than the first source gateway, to perform the first gateway reselection;

determining, in response to determining to perform the first gateway reselection, a first target gateway that is to be used to serve the communications apparatus, the first target gateway being the first gateway that the communications apparatus is to access;

performing the first gateway reselection by changing from being served by the first source gateway to being served by the first target gateway;

determining, in response to a second triggering event, whether to perform a second gateway reselection to reselect, from a second source gateway, a gateway for serving the communications apparatus, the second triggering event comprising detecting, by the communications apparatus, a user plane reconfiguration;

determining, in response to determining to perform the second gateway reselection and according to second location information of the communications apparatus, information about a user plane network element serving the communications apparatus, and gateway configuration information of second candidate gateways in a second serving domain in which the second source gateway is located, a second gateway that the communications apparatus is to access;

determining, based on identification information of the second gateway that the communications apparatus is to access, that the second gateway that the communications apparatus is to access is different than the second source gateway; and performing, in response to determining that the second gateway that the communications apparatus is to access is different than the second source gateway, the second gateway reselection by changing from being served by the second source gateway to being served by a second target gateway, the second target gateway being the second gateway that the communications apparatus is to access.

14. The communications apparatus according to claim 13, wherein the first triggering event comprises:

determining that an access network device accessed by the communications apparatus has changed.

15. The communications apparatus according to claim 13, wherein the instructions, when executed by the one or more processors, cause the communications apparatus further to perform:

sending a request message to a domain name server, requesting information of the first gateway that the communications apparatus is to access; and receiving, from the domain name server, identification information of the first gateway that the communications apparatus is to access.

16. The communications apparatus according to claim 13, wherein the instructions, when executed by the one or more processors, cause the communications apparatus further to perform:

sending a request message to a domain name server, wherein the request message requests information of the second gateway that the communications apparatus is to access, and the request message comprises the second location information of the communications apparatus and the user plane information; and receiving, from the domain name server, identification information of the second gateway that the communications apparatus is to access.

\* \* \* \* \*

UNITED STATES PATENT AND TRADEMARK OFFICE
CERTIFICATE OF CORRECTION

PATENT NO. : 11,647,436 B2
APPLICATION NO. : 17/207468
DATED : May 9, 2023
INVENTOR(S) : Haoren Zhu et al.

Page 1 of 1

It is certified that error appears in the above-identified patent and that said Letters Patent is hereby corrected as shown below:

In the Claims

Claim 9, Column 48, Lines 34 and 43; delete "first".

Signed and Sealed this
Twenty-seventh Day of June, 2023

Katherine Kelly Vidal
*Director of the United States Patent and Trademark Office*